United States Patent [19]

Kando

[11] Patent Number: 5,044,718
[45] Date of Patent: Sep. 3, 1991

[54] OPTICAL HEAD USED IN OPTICAL INFORMATION PROCESSOR

[75] Inventor: Hidehiko Kando, Matsudo, Japan
[73] Assignee: Hitachi, Ltd., Tokyo, Japan
[21] Appl. No.: 480,949
[22] Filed: Feb. 16, 1990
[30] Foreign Application Priority Data

Mar. 20, 1989 [JP] Japan ............................ 1-66196

[51] Int. Cl.⁵ .............................................. G02B 6/34
[52] U.S. Cl. .......................................... 385/4; 385/14; 385/37; 369/44
[58] Field of Search ............... 350/96.11, 96.12, 96.13, 350/96.14, 96.15, 96.18, 96.19; 369/44, 45

[56] References Cited

U.S. PATENT DOCUMENTS

| | | | |
|---|---|---|---|
| 4,718,052 | 1/1988 | Kondo et al. ............... | 350/96.11 X |
| 4,737,946 | 4/1988 | Yamashita et al. .......... | 350/96.11 X |
| 4,758,062 | 7/1988 | Sunagawa et al. ........... | 350/96.19 |
| 4,801,184 | 1/1989 | Revelli ........................ | 350/96.14 |
| 4,885,732 | 12/1989 | Sunagawa ................... | 350/96.12 X |
| 4,887,255 | 12/1989 | Handa et al. ................ | 350/96.12 X |
| 4,971,414 | 11/1990 | Funato et al. ................ | 350/96.19 |

FOREIGN PATENT DOCUMENTS 59-69732  4/1984  Japan.
61-232424  10/1986  Japan.

OTHER PUBLICATIONS

Nishihara, "Recent Progress in Optical Integrated Circuits",*Anritsu News*, vol. 7, No. 36, Mar. 1988, pp. 2-8.

*Primary Examiner*—John D. Lee
*Attorney, Agent, or Firm*—Antonelli, Terry, Stout & Kraus

[57] ABSTRACT

An optical head having a plane waveguide for propagating light emitted from a light source, a grating coupler disposed midway of said plane waveguide for converting light emitted from said light source into light which is propagated in said plane waveguide, and a diffraction grating which is different from said grating coupler for diffracting light emitted from said light source before the light is incident to above-mentioned grating coupler.

20 Claims, 18 Drawing Sheets

$\varphi$ : ANGLE AT WHICH LIGHT IS COUPLED TO GRATING COUPLER 11b

F I G. 13
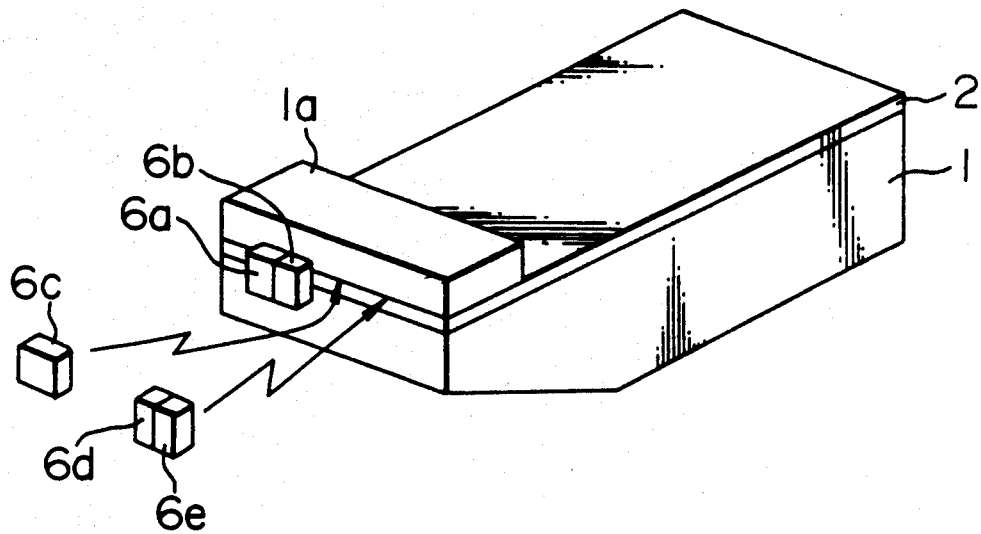
F I G. 14
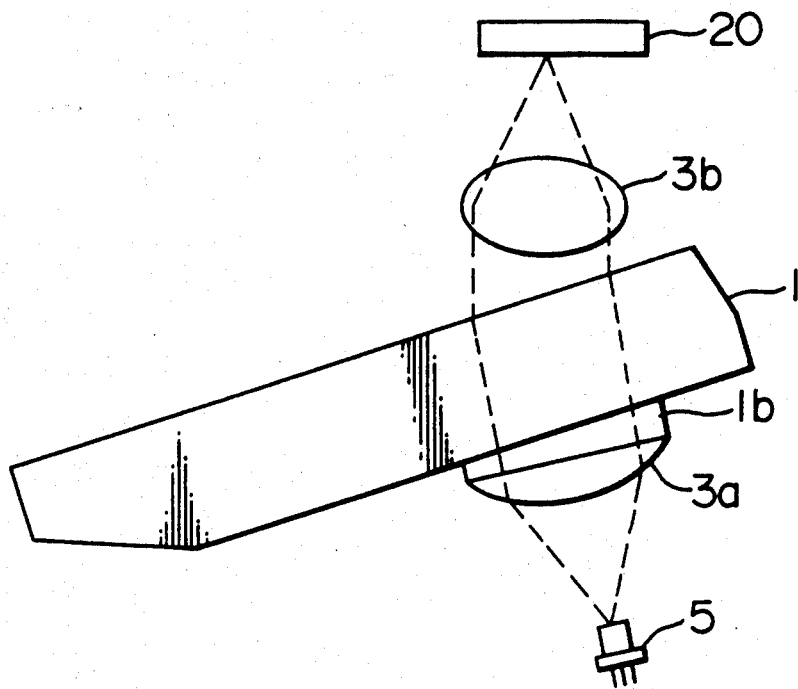

F I G. 25
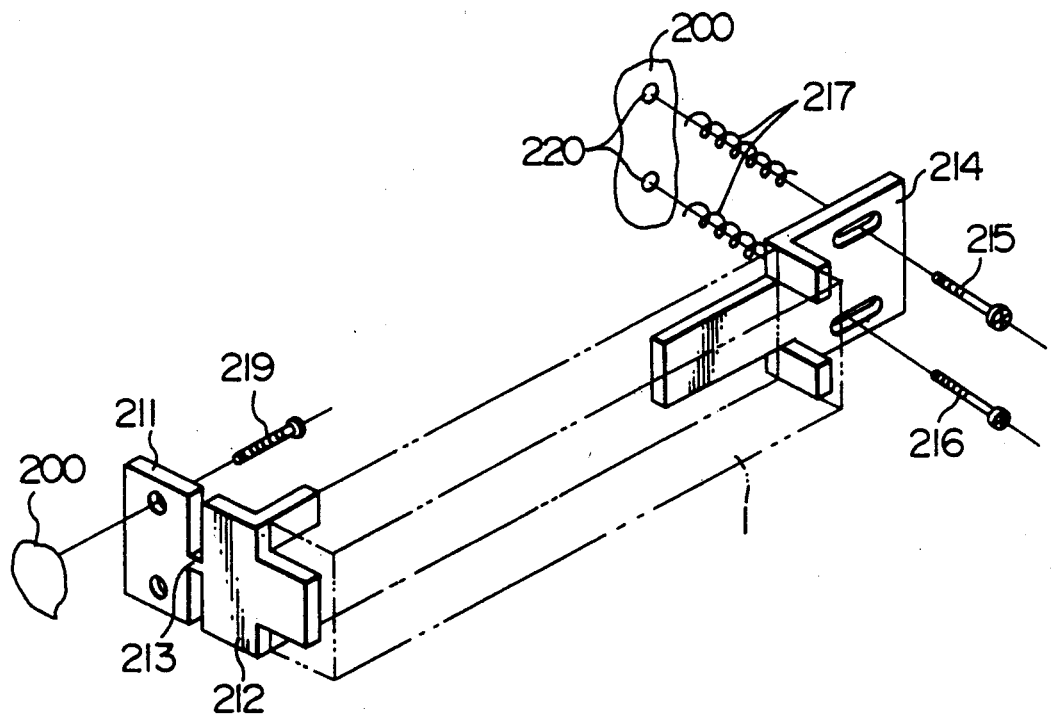
F I G. 26
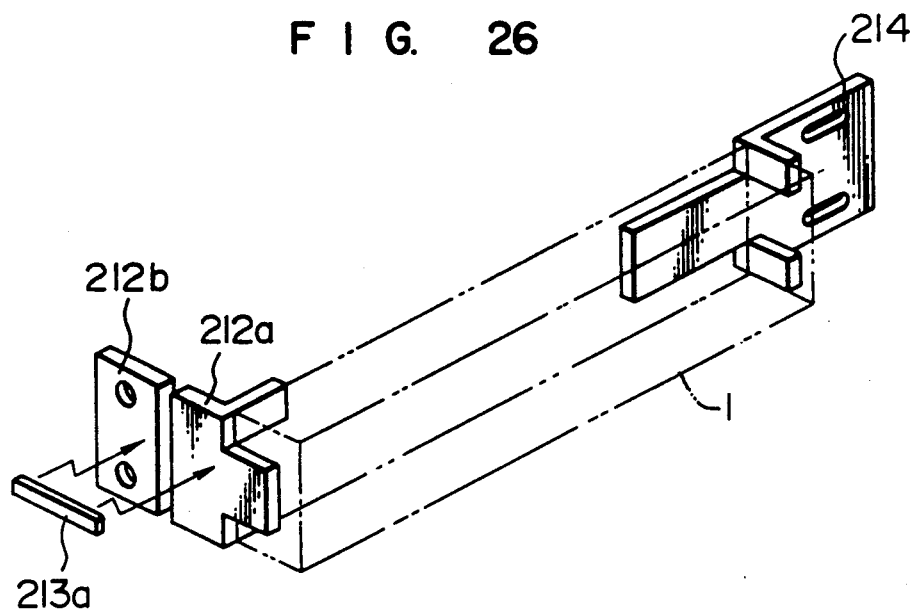

OPTICAL HEAD USED IN OPTICAL INFORMATION PROCESSOR

BACKGROUND OF THE INVENTION

The present invention relates to an optical head and more particularly to an optical head having an integrated optical pickup portion which is preferred to be used in an optical information processor (for example, an optical disk unit, an optical card reader or a read-write unit) which performs read and write of information of an optical information recording medium.

In general, it is well known that optical pickup group of optical heads of an optical information processor is integrated. For example, it is disclosed in "RECENT PROGRESS IN OPTICAL INTEGRATED CIRCUITS" by Hiroshi Nishihara, ANRITSU NEWS, Vol. 7, No. 36, March 1989. Also, an integrated construction of an optical pickup portion is disclosed in JP-A-59-69732 and JP-A-61-232424. U.S. Pat. No. 301,961 filed on Jan. 25, 1989 and Ser. No. 409,617 filed on Sept. 15, 1989 relate to optical information processing apparatuses.

SUMMARY OF THE INVENTION

In a conventional device of this sort, a semiconductor laser has been used as a light source, and reflected beams of light from an optical information recording medium (a photomagnetic disk in this description) has been used as the beams of light that are propagated through a waveguide by employing three focusing grating couplers.

In such a construction, however, there has been such a problem that when the wavelength of the output beams of light of the semiconductor laser is varied under the influence of environmental temperature change, return beams of light and the like, it becomes impossible to convert the beams of light into the beams of light that are propagated in the waveguide by the focusing grating coupler, thus deteriorating an optical characteristic of an element.

It is an object of the present invention to provide an optical head which always maintains a predetermined optical performance always in a stable manner even when the wavelength of output beams of light of a semiconductor laser is varied.

It is another object of the present invention to provide an optical head provided with a waveguide lens having an always stable predetermined converging function even when the wavelength of output beams of light of the semiconductor laser is varied.

Further, it is still another object of the present invention to provide an optical head in which unnecessary beams of light that are propagated inside the substrate are removed, an S/N ratio of a signal detected by a photodetector is improved, and stability and reliability of read and write operation of the signal from the optical information recording medium are improved.

Furthermore, it is still another object of the present invention to provide an arrangement in which a technique of using a multi-mode laser and a technique by high frequency superposition are applicable to said conventional device for the purpose of reducing laser noise, thus improving the S/N ratio from a photodetector and also improving the reliability of the device.

In order to accomplish above-described objects, according to an aspect of the present invention, an optical head is composed of a plane waveguide which propagates beams of light, a grating coupler which converts incident beams of light into beams of light that are propagated in a waveguide, first diffraction gratings which diffracts beams of light emitted and incident from a light source before said beams of light are incident to the grating couplers, and a second diffraction grating which leads beams of light diffracted by the first diffraction gratings to the grating couplers. According to another aspect of the present invention, there are provided a plurality of waveguide lenses which allow the beams of light that are propagated in the waveguide to pass therethrough in consecutive order. According to still another aspect of the present invention, there is provided a slant portion which is not in parallel with said waveguide on the back of the side of the substrate where the waveguide is installed other than the light passing area between the optical information medium and the grating couplers. In a preferred embodiment of the present invention, there is provided a high frequency oscillator which superposes high frequency a.c. to a d.c. current applied to the light source.

An angle of diffraction in the diffraction grating depends on the wavelength of beams of light. Further, a coupling angle of a beam of light (an angle at which a beam of light outside a waveguide can be converted into a guided beam of light) in the grating coupler also depends on the wavelength of the beam of light.

Now, a case in which a beam of light diffracted by the diffraction grating is incident to a grating coupler is considered. With this, the angle of the beam of light which is incident to the grating coupler is varied when the wavelength of the beam of light changes. By setting design parameters such as arrangement and pitch of diffraction gratings and pitch of grating couplers appropriately, the incident angle of the beam of light which is incident to the grating coupler is made to follow the coupling angle correctly even when the wavelength is varied. That is, the angle of the beam of light which is incident to the grating coupler is adjusted automatically depending on the wavelength by using the diffraction grating. With such a construction, an optical composition which prevents deterioration of optical performance due to variation of the wavelength and always maintains a predetermined optical performance is obtainable.

Further, when the angle of the beam of light which is incident to the grating coupler is adjusted automatically depending on the wavelength, it is possible to set the angle of te beam of light which is incident to the grating coupler to the coupling angle correctly in a wide range of wavelength variation by providing a plurality of diffraction gratings other than the grating coupler.

In a waveguide lens which converges beams of light that are propagated in the waveguide, aberration is liable to be produced and the light utilization efficiency is lowered when N.A. (Numerical Aperture, a lens constant which shows converging capacity of a lens) is made larger. Because of such a reason, it is possible to construct a lens having less aberration and high light utilization efficiency by combining a plurality of lenses each having small N.A. so as to form a lens group having a predetermined N.A. as a whole.

The slant portion which is installed on the back of the side of the substrate where the waveguide as installed and is not parallel with the waveguide has such an effect that unnecessary beams of light are not to be incident to a photodetector by changing the travelling direction of the unnecessary beams of light that are propagated in the substrate. Furthermore, the incident angle of the unnecessary beam of light which is incident to the slant portion is set to an angle closer to perpendicularity, which makes the transmission factor of the substrate for the unnecessary beam of light higher, thereby to remove the unnecessary beam of light outside the substrate. With this, it is prevented that the unnecessary beam of light is incident to the photodetector and an unnecessary signal is superposed to a detected signal in the photodetector.

It is possible to reduce laser noise by employing the high frequency superposing method or a multi-mode laser. Furthermore, it is possible to obtain a correct coupling with the grating coupler over the whole range of the wavelength band by such a method even if the wavelength band of the beams of light is spread. With this, it is possible to execute a technique of reducing laser noise without deteriorating the optical performance, thus improving the optical performance.

BRIEF DESCRIPTION OF THE DRAWINGS

FIG. 13 shows another embodiment of the present invention and is an explanatory view showing a fixing method of the photodetector;

FIG. 14 shows an embodiment of the present invention and is an explanatory view showing a lens fixing method;

FIG. 25 through FIG. 27 are perspective views of a holder for holding the substrate and conducting fine adjustment;

FIG. 26 is a block diagram of the whole optical information read/read-write device.

DESCRIPTION OF THE PREFERRED EMBODIMENTS

Embodiments of the present invention will be described hereafter with reference to FIG. 1 through FIG. 29.

Figure 1:
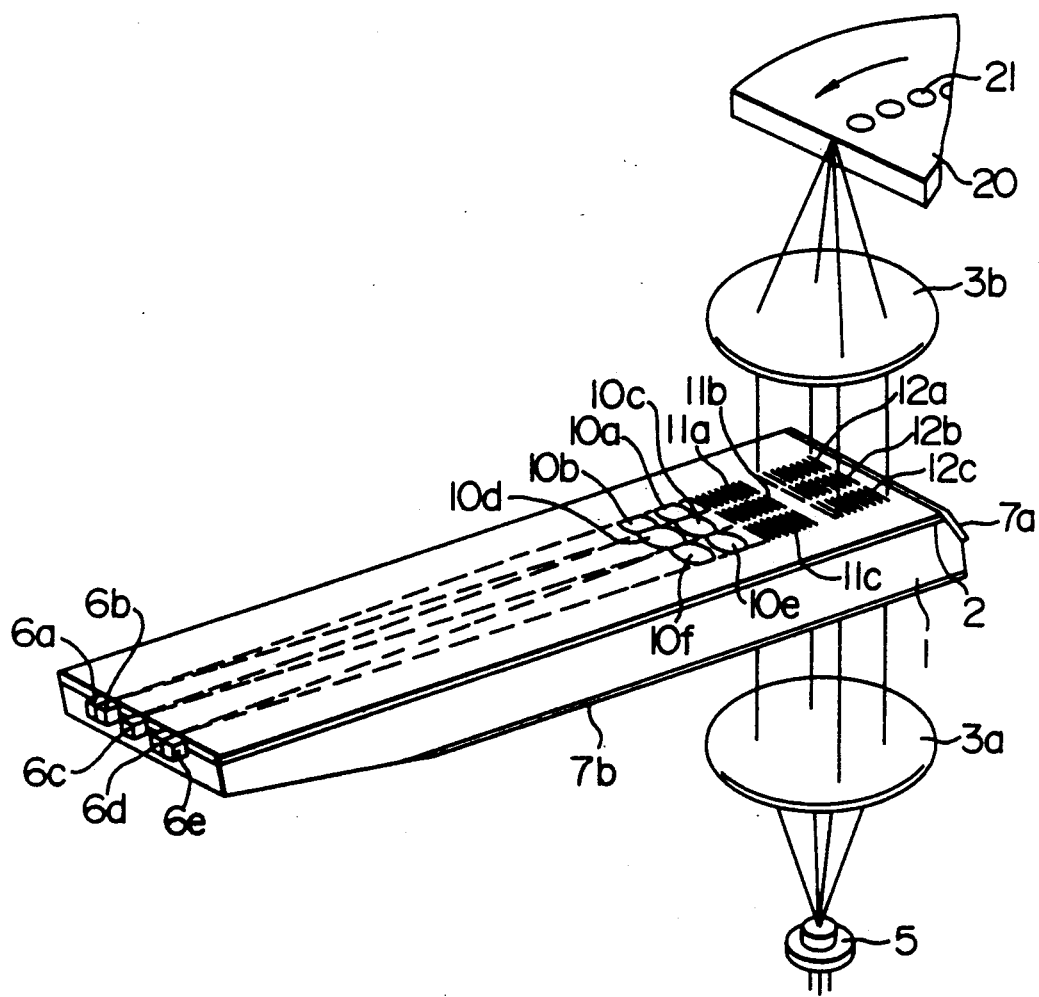
FIG. 1 is a perspective view showing an embodiment of the present invention.
Figure 2:
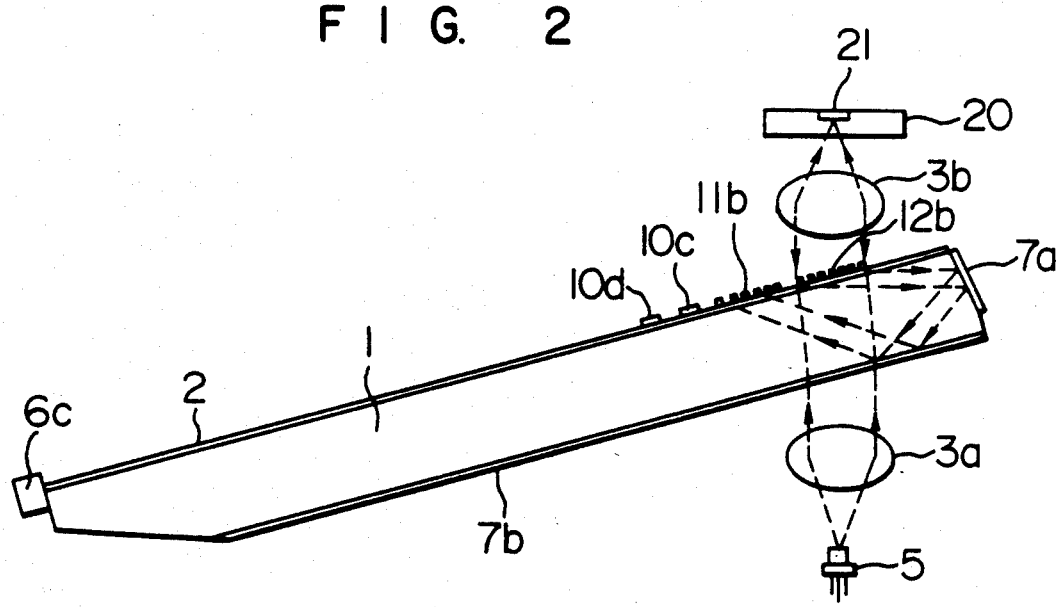
FIG. 2 is a cross-sectional view of the embodiment shown in FIG. 1.

First, an embodiment will be described with reference to FIG. 1 and FIG. 2. FIG. 1 is a perspective view showing an embodiment, and FIG. 2 is a cross-sectional view of the embodiment showing a light propagation status.

Beams of light emitted from a semiconductor laser 5 are made into parallel beams of light by means of a lens 3a. A part of these beams of light pass through a substrate 1 and are converged by means of a lens 3b, and form a focal point on an optical information medium 20. Information pits 21 are formed on this optical information medium 20. A plane of polarization of the reflected beam of light reflected by the optical information medium 20 varies by these pits. The substrate 1 is composed of glass, a dielectric among monocrystal materials and others.

The reflected beams of light are made into parallel beams of light by means of the lens 3b, and a part of these parallel beams of light are diffracted by diffraction gratings 12a, 12b and 12c. The diffracted beams of light are reflected by a dielectric multilayer reflecting film 7a and reflected totally by a bottom face of the substrate 1 (see FIG. 2). The beams of light diffracted by the diffraction grating 12a are reflected by the multilayer reflecting film 7a and the bottom face of the substrate and are incident to a grating coupler 11a. Also, the beams of light diffracted by a diffraction grating 12b are incident in a similar manner to a grating coupler 11b, and the beams of light diffracted by a diffraction grating 12c are similarly incident to a grating coupler 11c. In this connection, in the present embodiment, the diffraction gratings and the multilayer reflecting film are arranged so that the beams of light that are incident to the bottom face of the substrate are reflected totally there. An antireflection film provided on the bottom face of the substrate acts to remove unnecessary beams of light which will be described later. The beams of light which are incident to respective grating couplers are led to a waveguide 2 by the action of diffraction of the grating couplers and converted into beams of light (guided beams of light) that are propagated in the waveguide 2. (Hereafter, it is referred to as "optical coupling" that beams of light inside the waveguide are converted into beams of light outside the waveguide, or conversion is made reversely.) Lenses 10a and 10b cause the beams of light obtained by optical coupling in the grating coupler 11a to be incident to photodetectors 6a and 6b while forming a focal point in the vicinity of the boundary between both photodetectors 6a and 6b disposed adjacent to each other. Also, lenses 10c and 10d cause the beams of light obtained by optical coupling in the grating coupler 11b to be incident to a photodetector 6c. Further, lenses 10e and 10f cause the beams of light obtained by optical coupling in the grating coupler 11c to be incident to photodetectors 6d and 6e while forming a focal point in the vicinity of the boundary between both photodetectors 6d and 6e disposed adjacent to each other.

It should be noted that the pitch of the gratings of the grating couplers 11a and 11c is made to be suitable for optical coupling of light components in Transversed Electric mode (TE mode) or in Transversed Magnetic mode (TM mode), and that of the grating coupler 11b is made to be suitable for optical coupling of light components in TM mode or TE mode. As a result, separation between a photomagnetic signal and a tracking error signal is improved. The diffraction gratings 12a, 12b and 12c may have the same pitch.

The beams of light detected by the photodetector is transmitted to a signal processor, reads out an information pit 21 on the optical information medium 20, detects a focus error quantity and detects a track error quantity.

In the embodiment shown in FIG. 1, when beams of light obtained by optical coupling by respective grating couplers 11a, 11b and 11c are converged to photodetectors 6a through 6e, the convergent function is realized by a combination of two convex lenses such as lenses 10a and 10b, lenses 10c and 10d and lenses 10e and 10f. It is possible to obtain a combined lens for a waveguide having a short synthetic focal length by combining two or more waveguide type convex lenses, thus making it possible to make the substrate 1 small in size. With this, such an effect that the size may be made small as a whole is obtained. When such miniaturization is not necessarily required, the functions of lenses 10a and 10b described above are composed with a single waveguide lens. With such a composition, the optical construction to be provided in the waveguide becomes simpler, and the process of manufacturing an optical system related to the waveguide may be simplified. Besides, an example of combination of two convex lenses is disclosed in the figure as a lens for converging beams of light, but it may also be considered to construct a lens group having a converging function as a whole by combining one or more convex lenses for the waveguide with one or more concave lenses for the waveguide. In this case, it is possible to construct a waveguide lens having small chromatic aberration even if the oscillation wavelength of the semiconductor laser 5 is varied as in the case of an ordinary bulk achromatic lens. In particular, this effect is effectual when a diffraction grating type waveguide lens having a comparatively high wavelength dependency of performance is used. Further, it is possible to construct a lens having small aberration and high light utilization efficiency even when the N.A. of the waveguide lens which converges beams of light that are propagated in the waveguide by combining a plurality of waveguide lenses is made large. Here, the waveguide lens is well-known as described in detail in, for example, "Optical Integrated Circuit" by Hiroshi Nishihara, published by Ohm Company in 1985, hence omitting the explanation thereof.

Figure 3A:
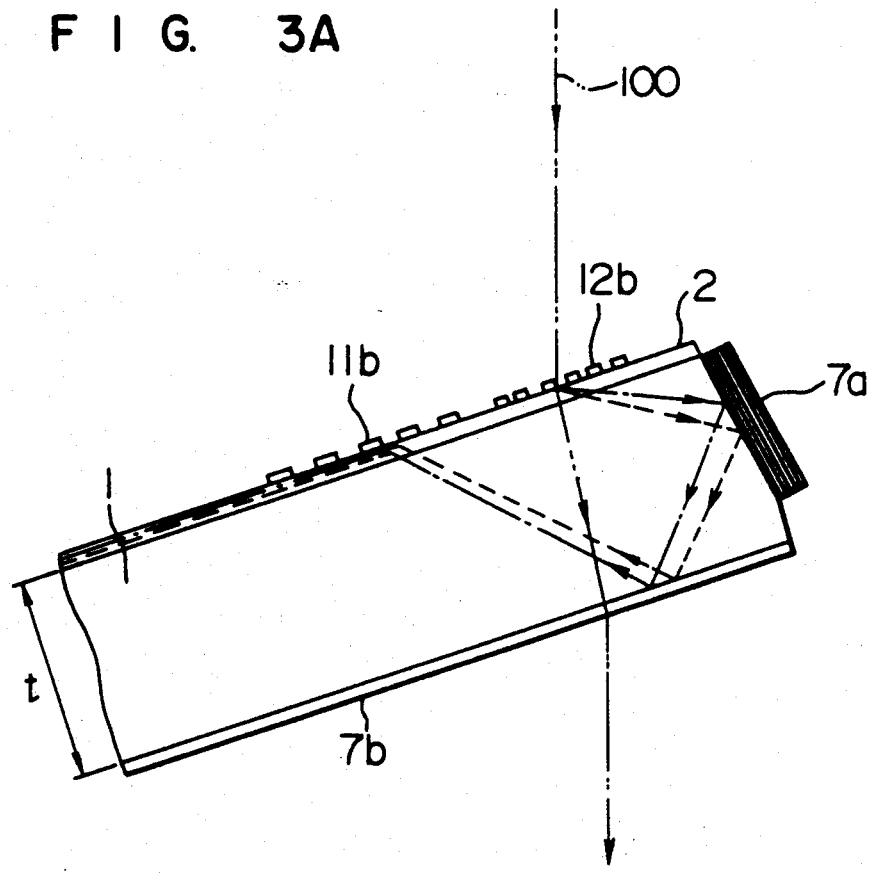
FIG. 3A and FIG. 3B are partly enlarged views of the sectional view of the embodiment shown in FIG. 1.
Figure 3B:
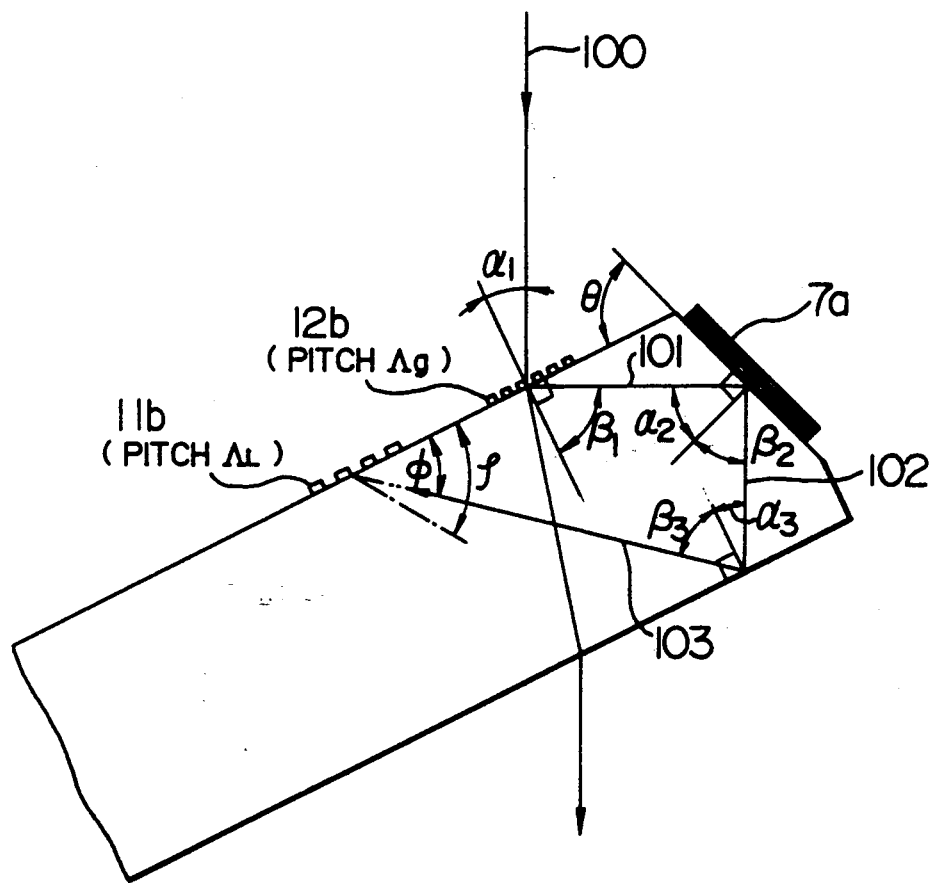

The status in which the beams of light that are reflected by the optical information recording medium 20 and made into parallel beams of light by the lens 3b are diffracted by the diffraction gratings 12a through 12c and are then converted into waveguide beams of light by the grating couplers 11a through 11c is shown in more detail in FIGS. 3A and 3B. FIGS. 3A and 3B show a part of the cross-sectional view of the substrate 1 shown in FIG. 1 and are cross-sectional views taken along the section including the diffraction grating 12b and the grating coupler 11b.

In the present embodiment, the semiconductor laser 5 is used as the light source as shown in FIG. 1. Therefore it may happen sometimes that the oscillation wavelength of the semiconductor laser is varied in actual operation due to the influence exerted by the intensity of a current applied to the semiconductor laser, return beams of light and others. In such a case, there is such a problem that it becomes impossible to perform efficient optical coupling in the grating couplers because conditions that beams of light are converted into guided beams of light in the grating coupler, viz., coupling conditions are varied. That is, when the optical coupling condition of beams of light at the grating coupler 11b having a pitch $\Lambda_L$ shown in FIG. 3B is considered, the required coupling angle of beams of light is expressed by an expression (1) as follows:

$$ns \frac{2\pi}{\lambda} \cos\psi + \frac{2\pi}{\Lambda_L} = N \frac{2\pi}{\lambda} \quad (1)$$

where:
ns : refractive index of substrate
$\lambda$ : wavelength of beam of light
$\psi$ incident angle of beams of light to the grating coupler 11b (an angle formed between beam of light and waveguide surface)
$\Lambda_L$ : pitch of grating coupler 11b
N : effective refractive index When the expression (1) is differentiated with respect to $\lambda$, the following expression is obtained:

$$\frac{d\psi}{d\lambda} = \frac{1}{ns \sin\psi} \left( \cos\psi \frac{dns}{d\lambda} - \frac{dN}{d\lambda} + \frac{1}{\Lambda_L} \right) \quad (2)$$

Here, it is realized from the expression (2) that, when the wavelength is varied, the required coupling angle of beams of light corresponding to the variation is changed. If this required coupling angle is varied, it becomes impossible to couple beams of light correctly when an optical system is designed on the assumption that beams of light are always incident to the grating couplers always at a constant angle. Thereupon, it is considered to use a substrate material having such a wavelength dispersion (dns/dλ, dN/dλ) of a refractive index that makes the parenthesized passage in the right side of the expression (2) zero for the purpose of eliminating the wavelength dependency of the required coupling angle $\psi$. If such a material is available, a grating coupler which always has a constant required coupling angle and can perform optical coupling always stably even if variation of the wavelength occurs can be realized by using said material.

When ordinary glass and the like are considered, however, it is difficult sometimes to obtain a material having such wavelength dispersion. In other words, it is difficult to make dψ/dλ zero in this case because wavelength dispersion of the refractive index is small. Accordingly, a construction which performs optical coupling always stably even when ordinary glass and the like are used. In this case, it is only required to vary the incident angle with respect to the grating coupler in accordance with the variation of the wavelength so as to always perform correct optical coupling.

In FIG. 3B, a beam of light 100 which is reflected by the optical information recording medium 20 and formed into parallel beams of light by the lens 3b shown in FIG. 1 is incident to the diffraction grating 12b, and a part thereof becomes a diffracted beam of light 101.

The diffraction angle at this time becomes the angle shown in an expression (3) as follows:

$$ns\Lambda_g \sin \beta_1 = -(no\Lambda_g \sin \alpha_1 + m\lambda) \quad (3)$$

where:
$\Lambda_g$ : pitch of diffraction grating 12b
$\alpha_1, \beta_1$ : angles defined in FIG. 3B
m : order of diffraction Besides, meanings of respective marks are shown in FIG. 3B.

An expression (4) is obtained by differentiating the expression (3) with respect to the wavelength.

$$\frac{d\beta_1}{d\lambda} = -\frac{m}{ns\Lambda_g \cos \beta_1} \quad (4)$$

It is understood that the diffraction angle of the diffracted beam of light 101 is varied in accordance with the wavelength. Next, the diffracted beam of light is incident to a dielectric multilayer reflecting film 7a provided on a slant face meeting with a waveguide plane at an angle $\theta$. The incident angle $\alpha_2$ in this case is obtained as shown in an expression (5) based on geometrical relationship of respective arrangements of the waveguide and the dielectric multilayer reflecting film.

$$\alpha_2 = \pi - \beta_1 - \theta \quad (5)$$

where:
$\theta$ : angle defined in FIG. 3B

The following expression is obtained by differentiating the expression (5).

$$\frac{d\alpha_2}{d\lambda} = -\frac{d\beta_1}{d\lambda} \quad (6)$$

Next, the reflection from the dielectric multilayer reflecting film is discussed. It may be expressed as an expression (7). However, only for the purpose of simplifying the expression, the difference between the refractive index of each of respective films that are constituent components of the dielectric multilayer reflecting film and the refractive index of the substrate is disregarded.

$$ns \frac{2\pi}{\lambda} \cos \alpha_2 + ns \frac{2\pi}{\lambda} \cos \beta_2 = \frac{2\pi}{\Lambda_m} \quad (7)$$

where:
$\alpha_2, \beta_2$ : angle defined in FIG. 3B
$\Lambda_m$ : film pitch of the dielectric multilayer reflecting film That is, materials having refractive indices, $n_1$ and $n_2$ (or multilayer) are placed one upon another repeatedly on the substrate having the refractive index ns thereby to form a dielectric multilayer reflecting film, but it is assumed that $|ns - n_1| < < ns$, $|ns - n_2| < < ns$.

The following expression is obtained by differentiating the expression (7) with respect to the wavelength $\lambda$.

$$ns\Lambda_m \sin \alpha_2 \frac{d\alpha_2}{d\lambda} + ns\Lambda_m \sin \beta_2 \frac{d\beta_2}{d\lambda} = 1 \quad (8)$$

Next, a beam of light 102 from the dielectric multilayer reflecting film is reflected by the bottom face of the substrate and becomes a reflected beam of light 103.

The incident angle when the beam of light is incident to the bottom face of the substrate is as shown in an expression (9) from geometrical relationship.

$$\alpha_3 = \theta - \beta_2 \quad (9)$$

The following expression is obtained by differentiating the expression (9) with respect to the waveguide.

$$\frac{d\alpha_3}{d\lambda} = -\frac{d\beta_2}{d\lambda} \quad (10)$$

In reflection, the relationship between the incident angle and the reflection angle is as shown in an expression (11).

$$\beta_3 = \alpha_3 \quad (11)$$

where:
$\alpha_3, \beta_3$ : angles defined in FIG. 3B

The following expression is obtained by differentiating the expression (11) with respect to the wavelength.

$$\frac{d\beta_3}{d\lambda} = \frac{d\alpha_3}{d\lambda} \quad (12)$$

Lastly, the incident angle $\phi$ when the beam of light which is diffracted by the diffraction grating 12b, reflected by the dielectric multilayer reflecting film 7a and reflected by the bottom face of the substrate is incident to the grating coupler 11b is as shown in an expression (13) from geometrical relationship.

$$\phi = \frac{\pi}{2} - \beta_3 \quad (13)$$

This incident angle has a wavelength dependency as shown in an expression (14) which is obtained by differentiating the expression (13).

$$\frac{d\phi}{d\lambda} = -\frac{d\beta_3}{d\lambda} \quad (14)$$

The relationship as shown in an expression (15) is required for the beam of light 103 which is incident to the grating coupler is applied with optical coupling at the grating coupler 11b. It is important that such a relationship is effected identically even when the wavelength is varied for performing always stable optical coupling. However, it is only required practically that an expression (15) is effected approximately within the range of variation of the wavelength of the light source which is used.

$$\psi = \phi \quad (15)$$

Here, a technique for obtaining such approximation is shown. That is, it is an object to provide a relationship such as shown in an expression (16) within the applied range of the wavelength of the light source ($|\lambda - \lambda_0| < \Delta\lambda$, in which $\lambda_0$ is a central wavelength and $\Delta\lambda$ is the range of wavelength variation). The expression (16) shows that, even if the wavelength $\lambda$ is varied and variation ($d\psi$ in the right side) in the required coupling angle is produced, the incident angle is varied ($d\phi$ in the right side) so as to follow the variation of the required coupling angle and the difference between the incident angle and the required coupling angle (left side) becomes always smaller (compensation) than the variation quantity of the required coupling angle. There is such an effect that optical coupling is always effected stably by compensating the required coupling angle automatically as described above.

$$|d\psi - d\phi| < |d\psi| \quad (16)$$

Here, $|\lambda - \lambda_0| < \Delta\lambda$

Now, a case when the relationship as shown in the expression (17) is effected will be described. This expression (17) shows that the variation of the incident angle for the grating coupler completely follows the variation of the required coupling angle caused by the variation of the wavelength at the design wavelength $\lambda_0$ of the light source. In such a case, the required coupling angle is not only compensated completely, but also the required coupling angle is compensated sufficiently in a practical point of view in the vicinity of $\lambda_0$, thereby to realize high coupling performance in a wide range.

$$(d\psi)_{\lambda=\lambda_0} = (d\phi)_{\lambda=\lambda_0} \quad (17)$$

Now, it will be described how to realize the relationship such as shown in the expression (16) and the expression (17). As it will be comprehended from the expression (1) through the expression (17), it is only required, in the expression (16) and the expression (17), to set design parameters, (for example, the substrate refractive index ns, the substrate external refractive index $n_0$, the central value $\lambda_0$ of the wavelength of the light source, the incident angle $\alpha_1$ of a beam of light which is incident to the diffraction grating, the pitch $\Lambda_g$ of the diffraction grating, the angle $\theta$ formed between the waveguide face and the dielectric multilayer reflecting film, the pitch $\Lambda_m$ and refractive index of each layer of the multilayer reflecting film, the pitch $\Lambda_L$ of the grating coupler and so on are thinkable) of respective components of all optical elements so that the expression (16) or further the expression (17) is effected. The number of respective parameters is more than the number of expressions to be solved, and the number of solutions is innumerable excluding those solutions that do not exist actually such as a negative pitch. So, it will be tried to find out optimum values of various design parameters. For example, there is the optimization from such a viewpoint as follows. However, this is an example only, and it is preferred practically to prepare some evaluation functions and perform optimization corresponding to these evaluation functions.

(1) It is tried to perform optical coupling in a wavelength range as wide as possible. That is, when it is assumed that the difference angle between $\psi$ and $\phi$ which is allowable in optical coupling is D, respective design parameters are optimized so as to make $|\lambda - \lambda_0|$ maximum while effecting the expressions (18) and (19).

$$\phi_{\lambda=\lambda_0} = \psi_{\lambda=\lambda_0} \quad (18)$$

$$|\phi_\lambda - \psi_\lambda| < D \quad (19)$$

where:

D : allowable difference angle between $\psi$ and $\phi$ (2) The angle $\alpha_3$ when a beam of light is incident to the bottom face of the substrate is selected so that total reflection is produced at the bottom face of the substrate in order to reduce components. with this, it is no longer required to form a specific reflecting film on the bottom face of the substrate.

(3) Respective pitches are made as large as possible for the purpose of improving productivity of the diffraction grating and the grating coupler.

(4) The thickness of the substrate is made as thin as possible. That is, the position where the grating coupler 11b is to be disposed is determined from respective angles, the position of the diffraction grating 12b and the thickness t of the substrate shown in FIGS. 3A and 3B. The thickness of the substrate is determined so that the diffraction grating 12b and the grating coupler 11b are not located at the same position, but this thickness is made as thin as possible.

(5) The diffraction grating 12b and the grating coupler 11b are designed so as to have the same pitch. With this, the manufacturing process in forming the grating is devised to be simplified.

(6) The diffraction grating 12b and the grating coupler 11b are arranged to be positioned at the same position by adjusting the thickness of the substrate in addition to the above item (5). With this, it is possible to incorporate two functions of the diffraction grating 12b and the grating coupler 11b in one diffraction grating. That is, it is possible to construct a single diffraction grating having a composite function which functions as a diffraction grating generating the beam of light 101 for the beam of light 100 and a grating coupler generating a guided beam of light for the beam of light 103.

When compensation of the wavelength variation was explained with reference to FIG. 3A and FIG. 3B, a beam of light which is diffracted by the diffraction grating 12b and applied with optical coupling in the grating coupler 11b was selected typically in the explanation. The same is applied to those beams of light that are diffracted by the diffraction gratings 12a and 12c, respectively, and coupled optically at respective grating couplers 11a and 11b. However, each of the diffraction gratings 12a, 12b and 12c does not necessarily have a pitch different from the other, and has the same pitch as that of those adjacent to each other. Therefore, the regional boundary cannot be discriminated sometimes. Even in such a case, consideration is taken by classifying logically in such a manner that the portion which transmits a beam of light to the grating coupler 11a is the diffraction grating 12a, the portion which transmits a beam of light to the grating coupler 11b is the diffraction grating 12b, and the portion which transmits a beam of light to the grating coupler 11c is the diffraction grating 12c.

A dielectric multilayer reflecting film 7a is used at the portion which reflects the beam of light 101. This is used as a reflection type diffraction grating. By using such a dielectric multilayer reflecting film, it is possible to manufacture a diffraction grating having waveform dependency at a predetermined reflecting angle easily, and also to increase the reflection efficiency. It is also possible to use a sawtooth reflecting diffraction grating at the portion reflecting the beam of light 101.

It is disclosed in FIG. 3B showing an embodiment that the face on which the dielectric multilayer reflecting film 7a is located is not perpendicular to the face on which the diffraction grating 12b is located, but forms a predetermined angle $\theta$ which is determined by the expression (9) therebetween. This is for effecting coupling conditions in the grating coupler 11b more correctly. By doing so, such an effect that optical performance may be maintained more stably even if the wavelength is varied is obtained. Otherwise, the face on which the dielectric multilayer reflecting film 7a is located and the face on which the diffraction grating 12b is located may be disposed so as to be perpendicular to each other. By doing so, such an effect that substrate processing may be made easier is obtained. This is also an example of optimization of above-described respective design parameters.

Total reflection of the bottom face of the substrate 1 can be utilized for the reflection of the beam of light 102. The configurations of the diffraction grating 12b and the dielectric multilayer reflecting film 7a are determined so as to meet the total reflection conditions for the bottom face of the substrate. By doing so, there is such an effect that the beam of light 102 is reflected with a high reflectance ratio without using a specific reflecting material, thus making it possible to simplify the construction. Otherwise, it is also possible not to utilize total reflection. In this case, a reflecting film for the beam of light 103 is installed on the bottom face of the substrate. By doing so, there is such an effect that it is possible to simplify design conditions in designing the optical system and to improve the degree of freedom in designing, thereby to design an optical system having superior optical performance.

Above-described stabilization of optical performance against waveform variation has been explained using the diffraction grating 12b and the grating coupler 11b. The same is applied to the beam of light which is diffracted by the diffraction grating 12a and coupled optically in the grating coupler 11a and also to the beam of light which is diffracted by the diffraction grating 12c and coupled optically in the grating coupler 11c.

The conditions of optical coupling of beams of light in the grating coupler are different depending on whether the beam of light which is incident to the grating coupler is an s wave or a p wave for the grating coupler. such a phenomenon is produced because of the fact that the propagation speed of a beam of light is different (the effective refraction index of the waveguide is different) depending on whether the guided beam of light is an s wave or a p wave when the beam of light is propagated in the waveguide. For example, when the grating coupler 11b is designed so that an s wave is coupled optically, s wave component only is optically coupled selectively among those beams of light that are incident to the grating coupler 11b, and optical coupling is not applied to the p wave component. Conversely speaking, this also means that the intensity of the s wave component only among those beams of light that are incident to the grating coupler 11b is ascertained from the intensity of the guided beam of light obtained by optical coupling. Similarly, when the grating coupler 11b is designed so that a p wave is optically coupled, p wave component only is optically coupled selectively among those beams of light that are incident to the grating coupler 11b, and optical coupling is not applied to the s wave component. Conversely speaking, this also means that the intensity of the p wave component only among those beams of light that are incident to the grating coupler 11b is ascertained from the intensity of the guided beam of light obtained by optical coupling.

Now, in FIG. 1, a grating coupler of s wave coupling and the same of p wave coupling are prepared among the grating couplers 11a, 11b and 11c, and the output of the photodetector which detects a guided beam of light obtained by s wave coupling and the output of the photodetector which detects a guided beam of light obtained by p wave coupling are compared among the intensity of photodetectors 6a through 6e which detect guided beams of light intensity, thereby to detect the s wave component and the p wave component independently in the beams of light reflected by the optical information recording medium 20 so as to detect plane of polarization of the reflected beam of light. With this, it is possible to detect whether the polarization is varied at the information pit 21 located on the optical information recording medium 20 or not, and to read out the information. For example, the grating couplers 11a and 11c are of s wave coupling and the grating coupler 11b is of p wave coupling. Then, an information readout signal is obtained by comparing the sum of outputs from four photodetectors 6a, 6b, 6d and 6e with the output from the photodetector 6c. The same is applied when the grating couplers 11a and 11c are of p-wave coupling and the grating coupler 11b is of s-wave coupling in contrast with above.

In the present embodiment, the waveguide 2 on the substrate 1 is used, but the waveguide is well known in itself to those skilled in the art, hence omitting the explanation thereof. If necessary, see, for example, "Optical Integrated Circuit" by Hiroshi Nishihara et al., published by Ohm Company, 1985, or "Optical Integrated Circuit (Foundation & Application)" by Society of Applied Physics, edited by Optical Confabulation Association, Asakura Book-Store, 1988.

In the present embodiment, a grating coupler is used for optical coupling of beams of light, but the grating coupler itself is well known, hence omitting the explanation thereof. If necessary, see, for example, "Optical Integrated Circuit" by Hiroshi Nishihara et al., published by Ohm Company, 1985 or "Optical Integrated Circuit"(Foundation & Application)"by Society of Applied Physics, edited by Optical Confabulation Association, Asakura Book-Store 1988.

In the present embodiment, those that have gratings formed linearly are used for the diffraction gratings 12a through 12c and grating couplers 11a through 11c are used. That is, the diffraction gratings 12a through 12c are diffraction gratings having linear gratings (hereafter referred to as linear gratings), and the grating couplers 11a through 11c are grating couplers having linear gratings (hereafter referred to as linear grating couplers). In case of a linear grating, when the wavelength of the incident beam of light is varied, the diffraction angle is varied principally, and almost no influence is exerted on the convergent status of the diffracted beams of light (a word of convergent status is used here for describing whether the beam of light is parallel beams of light, or convergent beams of light, or divergent beams of light and the extent of the quantity thereof) and on the wavefront abrasion of the diffracted beams of light. Similarly, in case of a lienar grating coupler, when the wavelength of the incident beam of light is varied, the coupling angle and the coupling efficiency are varied as the result of such variation, and almost no influence is exerted on the convergent status of the beam of light obtained by optical coupling and on the wavefront abrasion of the beam of light obtained by optical coupling. In FIGS. 3A and 3B, a beam of light which was diffracted by the linear grating and became a guided beam of light thereafter by the linear grating coupler does not show any change in the characteristic of the wavefront thereof even if the wavelength is varied because of above-described reason. Thus, there is such an effect that it is possible to construct an optical system which shows no change in abrasion and convergent status of a beam of light converted in a guided beam of light even if the wavelength is varied and has an always stable optical performance by using a linear grating for the diffraction grating and a linear grating coupler for the grating coupler. However, when the quantity of wavefront abrasion and the convergent status of the guided beam of light produced by wavelength variation can be disregarded in practical application, a diffraction grating having curved gratings for the diffraction grating or a grating coupler (so-called focusing grating coupler) having curved gratings for the grating coupler may be used. By doing so, it is possible to incorporate the functions of the lens 3a and the lens 3b into the diffraction gratings 12a through 12c and to incorporate the functions of the lenses 10a through 10f into the grating couplers 11a through 11c. Another embodiment will be described for this operation. By doing so, there is such an effect that the number of optical elements may be reduced, and the number of components can be reduced and the manufacturing can be simplified.

Next, embodiments in which the S/N ratio of the output from the photodetector is improved by attenuating unnecessary beams of light which are propagated in the substrate will be described with reference to FIG. 4, FIG. 5, FIG. 6 and FIG. 7. FIG. 4, FIG. 5, FIG. 6 and FIG. 7 are sectional views taken along a section including the photodetector 6c, the grating coupler 11b and the diffraction grating 12b shown in FIG. 1. Further, the following discussion is also held good for the section including the photodetectors 6a and 6b, the grating coupler 11a and the diffraction grating 12a shown in FIG. 1, and for the section including the photodetectors 6d and 6e, the grating coupler 11c and the diffraction grating 12c shown in FIG. 1.

Figure 4:
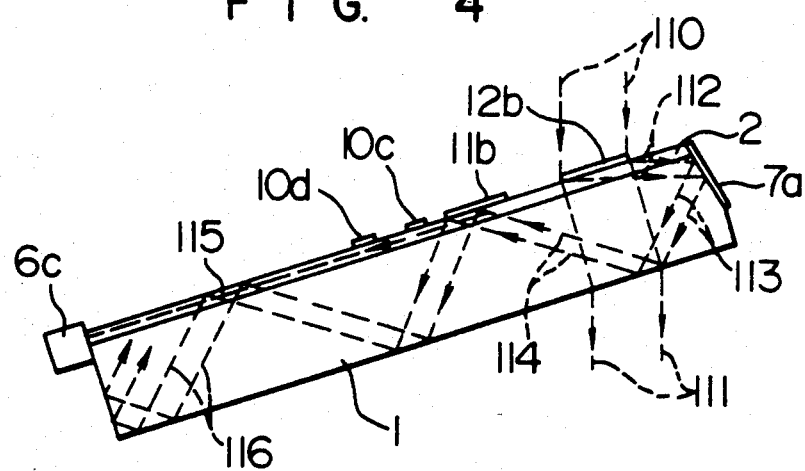
FIG. 4 is a cross-sectional view of the embodiment shown in FIG. 1 and is also an explanatory view for explaining the status of a light signal in the substrate.

FIG. 4 is a view for explaining how unnecessary beams of light are generated and how these beams of light deteriorate the S/N ratio of a signal. In FIG. 4, beams of light 110 that are incident to the diffraction grating 12b are partly diffracted by the diffraction grating 12b and become diffracted beams of light 112. Further, those beams of light that are not diffracted become non-diffracted beams of light 111 and are emitted outside the substrate 1. The diffracted beams of light 112 are reflected by the dielectric multilayer reflecting film 7a and become beams of light 113. These beams of light 113 are reflected totally by the bottom face of the substrate 1 and become beams of light 114, which are then incident to the grating coupler 11b. A part of these beams of light 114 is coupled with the waveguide 2 and becomes a guided beam of light 115 (a beam of light which is propagated inside the waveguide). Further, those beams of light which were not coupled are reflected by the waveguide surface and become unnecessary beams of light 116 that are propagated in the substrate. These unnecessary beams of light 116 are propagated inside the substrate while being always reflected totally by the surface and the bottom face of the substrate. There is a problem that these beams of light have small attenuation, and in addition, they are reflected a plurality of times, thus being incident partly to the photodetector 6c finally and superposed on the guided beams of light 115 that are to be incident to the photodetector 6c primarily thereby to deteriorate the S/N ratio of the signal.

It is impossible practically to make the coupling efficiency of the grating coupler 11b shown in FIG. 4 100 percent completely, and generation of the unnecessary beams of light 116 cannot be avoided.

Figure 5:
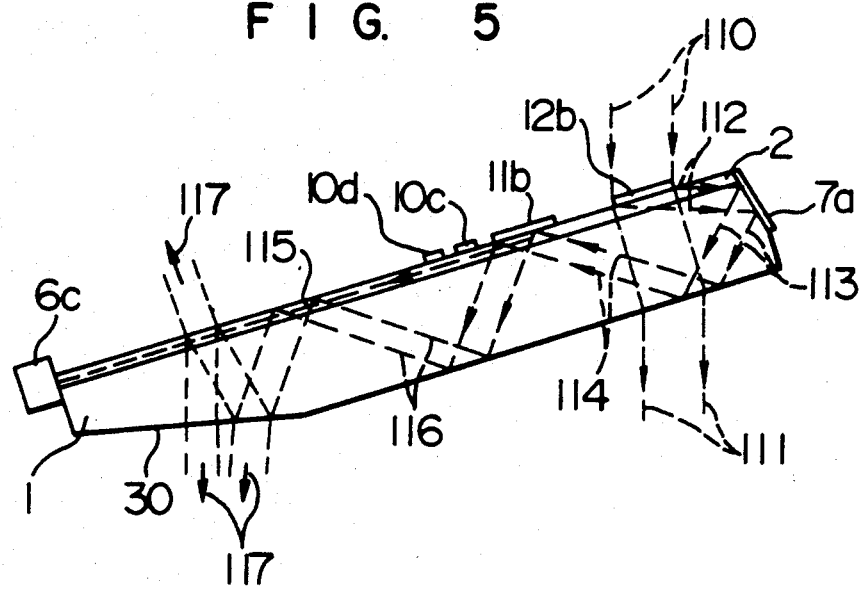
FIG. 5 through FIG. 7 show other embodiments of the present invention, respectively.
Figure 6:
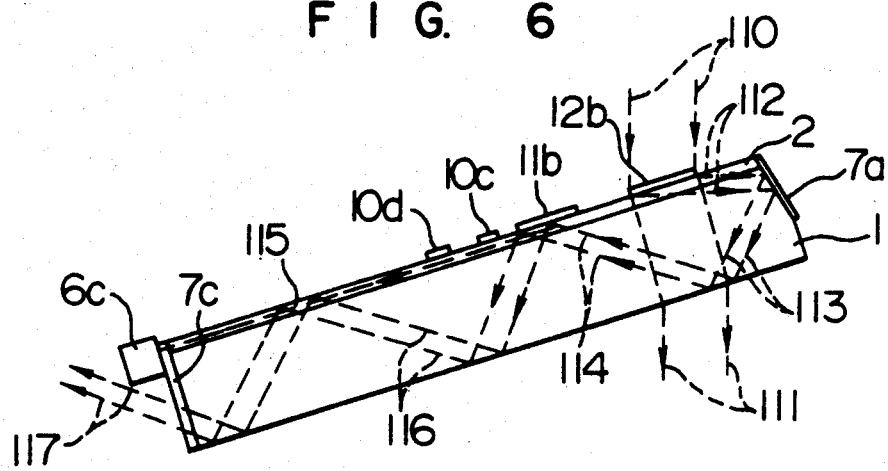

In order to prevent such deterioration of the S/N ratio by these unnecessary beams of light from deteriorating the optical characteristics of the elements, a slant face 30 is provided on the bottom face of the substrate in the embodiment shown in FIG. 5. With this, the unnecessary beams of light 116 that are incident to the slant face 30 are not reflected totally at the slant face, and a part thereof goes out as transmitted beams of light 117. The beams of light that are reflected by the slant face 30 has a large incident angle to the waveguide surface (incidence to a reflecting face at an angle close to perpendicularity is called that the incident angle is large) and does not longer hold the total reflecting condition, thus a part thereof goes out of the substrate as the transmitted beams of light 117. In such a manner, the intensity of the unnecessary beams of light 116 is attenuated every time they are reflected by the portion of the slant face 30, and the incident angle to the slant face 30 and the waveguide surface becomes larger and the reflectance ratio becomes smaller sometimes whenever it is further reflected, thus making it possible to attenuate these unnecessary beams of light effectively. By providing the slant face 30 as described above, there is such an effect that the S/N ratio of the signal detected by the photodetector can be improved. FIG. 6 shows another embodiment in which deterioration of the S/N ratio by unnecessary beams of light is prevented from deteriorating the optical characteristics of the elements. As shown in FIG. 6, an antireflection film 7c is provided at the end face of the substrate. By doing so, it is possible to have the unnecessary beams of light 116 emit outside the substrate as the transmitted beams of light 117 efficiently without being reflected by the end face, thereby to attenuate the unnecessary beams of light effectively. By providing an antireflection film 7c as described above, there is such an effect that the S/N ratio of the signal detected by the photodetector can be improved. It should be noted that the antireflection film 7c may be provided not only on the end face of the substrate, but also at any place so long as it is a portion on the substrate to which the unnecessary beams of light 116 are incident.

Figure 7:
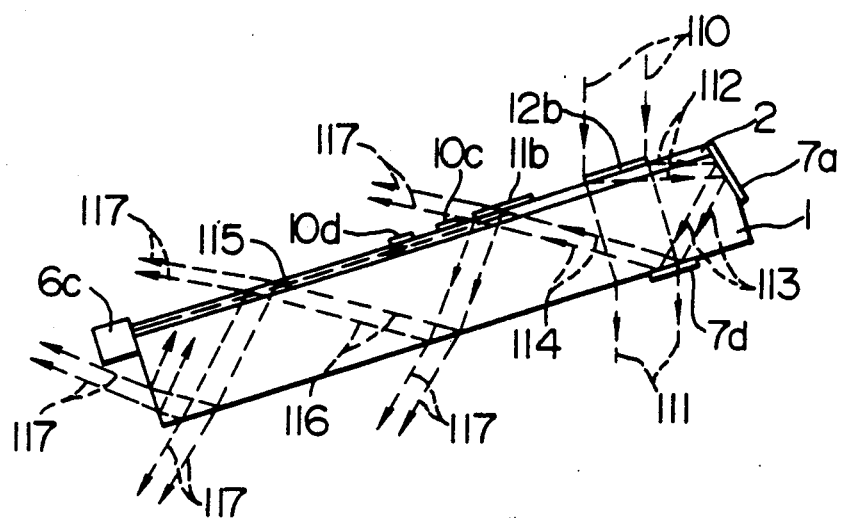

FIG. 7 shows still another embodiment in which deterioration of the S/N ratio by unnecessary beams of light is prevented from deteriorating the optical characteristics of the elements. As shown in FIG. 7, a reflecting film 7d is provided on the bottom face of the substrate. In a construction which has been heretofore adopted, total reflection by the bottom face of the substrate has been utilized for leading the beams of light reflected by the dielectric multilayer reflecting film 7a to the grating coupler 11b in order to reduce the number of components. This fact may cause that the unnecessary beams of light 116 shown in FIG. 4 through FIG. 6 continue to be reflected totally in the substrate and prevent attenuation of quantity of light, thus a large amount of these unnecessary beams of light are incident to the photodetectors eventually. Therefore, in the embodiment shown in FIG. 7, total reflection by the bottom face of the substrate is not utilized for leading the beams of light reflected by the dielectric multilayer reflecting film 7a to the grating coupler 11b. It can be determined in advance whether the total deflection by the bottom face of the substrate is utilized or not by adjusting the incident angles of the beams of light with respect to the bottom face of the substrate by means of design configurations, arrangement and so forth of the diffraction grating 12b and the dielectric multilayer reflecting film 7a.

The beams of light reflected by the dielectric multilayer reflecting film 7a are reflected by the action of a reflecting film 7d located on the bottom face of the substrate and are incident to the grating coupler 11b. The incident beams of light partly become the guided beam of light 115 after optical coupling, partly become the unnecessary beams of light 116 after reflected, and partly transmit to become the transmitted beams of light 117. The reflected unnecessary beams of light 116 are propagated by being reflected by the underside of the substrate and the waveguide surface repeatedly. Since a part of the beams of light is emitted outside the substrate every time it is reflected as the transmitted beams of light 117, these unnecessary beams of light 116 are reduced effectually. With this, such an effect is obtained that it is possible to reduce unnecessary beams of light that are superposed on the photodetector and to improve the S/N ratio of the signals detected by the photodetectors.

Here, a metallic reflecting film may be used for the reflecting film 7d. In such a case, an effect that the manufacture becomes easier and the S/N ratio of the signals detected by the photodetectors can be improved. In FIG. 2, however, if the reflecting film 7d shown in FIG. 7 exists in the passage of the beams of light (the portion where the beams of light transmit) where the beams of light emitted from the semiconductor laser 5 reach the optical information medium 20, a part of the beams of light reaching to the optical information medium 20 is interrupted, thus reducing the quantity of the beams of light irradiated onto the optical information medium 20. Accordingly, the reflecting film 7d is positioned to a position where such thing will not happen.

Further, it is possible to use a dielectric multilayer reflecting film for the reflecting film 7d. The dielectric multilayer reflecting film is able to function as a reflection type diffraction grating. It is in the vicinity of Bragg angle only that reflection occurs. The dielectric multilayer reflecting film is designed so that the beams of light 113 are reflected and the incident angles of the beams of light 113 become the Bragg angle. In this case, the beams of light that are emitted from the semiconductor laser 5 and reach the optical information medium 20 as shown in FIG. 2 have incident angles with respect to the dielectric multilayer thin film which are different from Bragg angle by a large margin. That is, the beams of light that are emitted from the semiconductor laser 5 and reach the optical information medium 20 as shown in FIG. 2 are not affected by reflection and diffraction at this dielectric multilayer reflecting film 7d. With such an arrangement, there are such effects that, even if the reflecting film 7d exists in the passage of the beams of light where the beams of light emitted from the semiconductor laser 5 reach the optical information medium 20, the beams of light reaching the optical information medium 20 will never be interrupted, thus making it possible to utilize the beams of light effectually, and that the degree of freedom on the installation position of the reflecting film 7 is increased and the size of the substrate 1 may be reduced.

Further, there is also a method in which the reflecting film 7d is not used at all. In this case, since the reflectance ratio is low when the beams of light 113 are reflected, the quantity of light of the beams of light 114 is small. Therefore, the quantity of beams of light coupled optically by the grating coupler 11b and detected by the photodetector 6c is reduced. However, there is such an effect that the construction is simple, and the S/N ratio of the signals detected by the photodetectors can be improved.

If the quantity of the unnecessary beams of light that are incident to the photodetectors is at a level causing no problem for practical use, the technique explained in particular with reference to FIG. 5 through FIG. 7 may be omitted. In this case, such an effect is obtained that the construction is simplified and the manufacture becomes easier.

Figure 8:
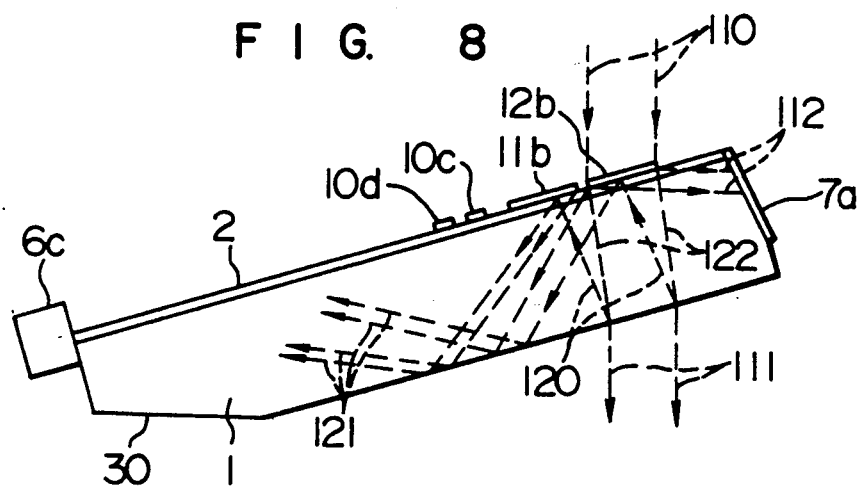
FIG. 8 is a view useful for explaining unnecessary beams of light which is propagated in the substrate.
Figure 9:
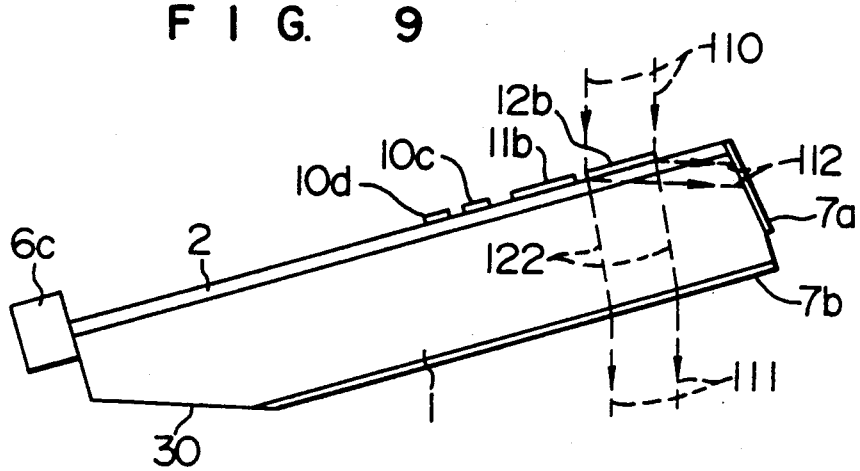
FIG. 9 shows a sectional view of another embodiment of the present invention.

Next, an embodiment in which the unnecessary beams of light that are propagated in the substrate are prevented thereby to improve the S/N ratio of the outputs from the photodetectors will be explained with reference to FIG. 8 and FIG. 9. FIG. 8 and FIG. 9 are sectional views taken along a section including the photodetector 6c, the grating coupler 11b and the diffraction grating 12b shown in FIG. 1. Further, the following discussion may be applied similarly to the section including the photodetectors 6a and 6b, the grating coupler 11a and the diffraction grating 12a shown in FIG. 1 and the section including the photodetectors 6d and 6e, the grating coupler 11c and the diffraction grating 12c shown in FIG. 1.

In FIG. 8 and FIG. 9, the beams of light 110 that are incident to the diffraction grating 12b are diffracted by the diffraction grating 12b and become the diffracted beams of light 112. Further, beams of light 122 that were not diffracted by the diffraction grating 12b transmit partly through the bottom face of the substrate and become beams of light 120, which are propagated in the substrate 1 as unnecessary beams of light. Since these beams of light 120 themselves are incident to the bottom face of the substrate and the waveguide at a large angle, the beams of light 120 are considered to be attenuated fully before they are incident to the photodetector 6c. However, if these beams of light 120 are incident to the diffraction gratings 12b and 11b disposed on the waveguide surface, they are diffracted by the diffraction gratings and become unnecessary beams of light 121 that are propagated in the substrate. These beams of light 121 are propagated in the substrate and are incident to the photodetector 6c, causing aggravation of the S/N ratio of the signal detected by the photodetector 6c. In order to prevent such deterioration of performance, an antireflection film 7b is installed on the bottom face of the substrate in the embodiment shown in FIG. 9. This antireflection film 7b prevents beams of light 122 that were not diffracted by the diffraction grating 12b from generating the reflected beams of light 120 from the bottom face of the substrate. By doing so, the unnecessary beams of light 120 are not generated, thus making it possible to prevent the unnecessary beams of light 121, too. With this, such an effect is obtained that aggravation of the S/N ratio of the signal detected by the photodetector 6c is prevented and high optical performance may be maintained always stably. Besides, since the antireflection film 7b has angle selectivity, the diffracted beams of light 112 that are reflected by the reflecting film 7a and incident to the antireflection film 7b may be reflected by the antireflection film 7b. In addition to the preventive method against unnecessary beams of light using the antireflection film 7b such as described above, there is also a method of preventing unnecessary beams of light by determining positions of respective elements so that the reflected beams of light 120 in FIG. 6 are not incident to the diffraction grating 12b and the grating coupler 11b, thereby to prevent unnecessary beams of light. This technique can be materialized by setting the substrate thickness and dimension and angle, etc. of the arrangement face of respective optical elements appropriately. In this case, such an effect that the antireflection film 7b is no longer required and the construction may be simplified is obtained.

Next, embodiments in which the utilization efficiency is improved will be described with reference to FIG. 10 and FIG. 11.

Figure 10:
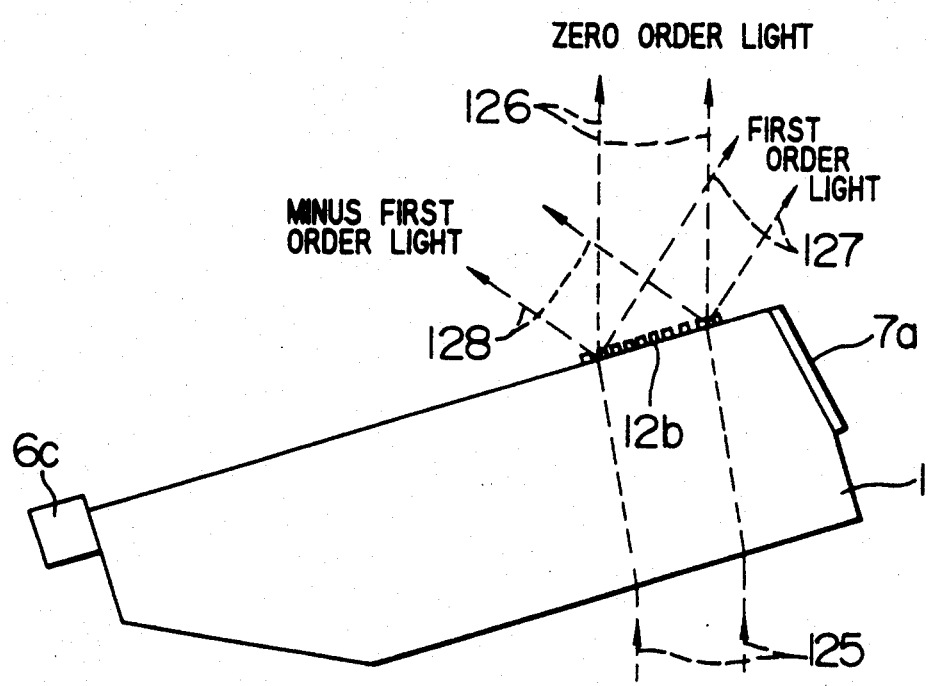
FIG. 10 and FIG. 11 are sectional views of other embodiments of the present invention.
Figure 11:
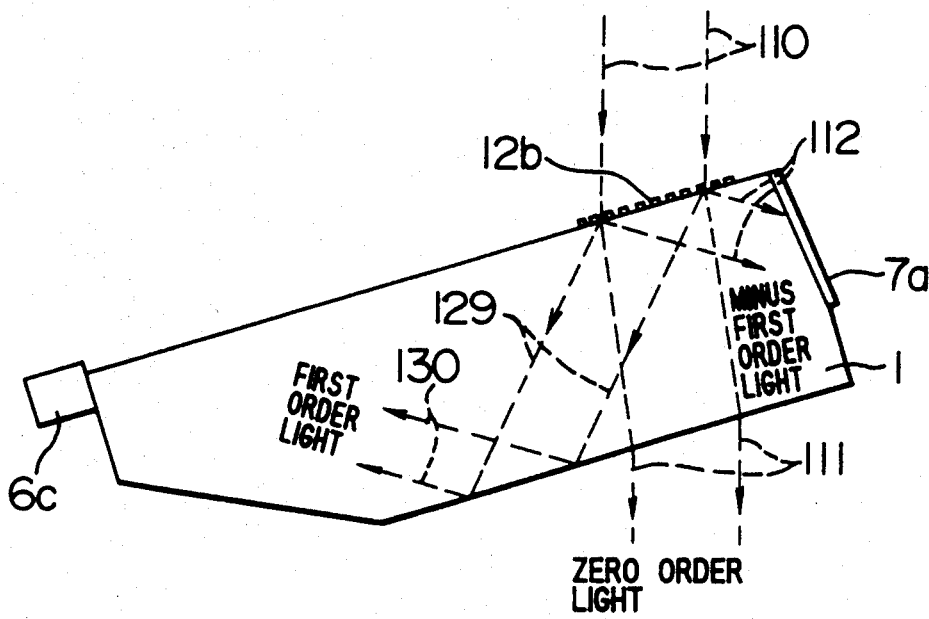

FIG. 10 and FIG. 11 are sectional views taken along a section including the diffraction grating 12b shown in FIG. 1. Further, the following discussion may be applied to the section including the diffraction grating 12a shown in FIG. 1 and the section including the diffraction grating 12c shown in FIG. 1.

In FIG. 10, beams of light 125 that are emitted from the semiconductor laser 5 in FIG. 1 and formed into parallel beams of light by the lens 3a shown in FIG. 1 pass through the substrate 1 are incident to the diffraction grating 12b. These beams of light 125 further pass through the diffraction grating 12b and become beams of light 12b, and converged by the lens 3b shown in FIG. 1 and reach the optical information medium 20 shown in FIG. 1. When the beams of light 125 transmit through the diffraction grating 12b, diffracted beams of light 127 and 128 are generated depending on design conditions of the diffraction gratings. Because of generation of diffracted beams of light 127 and 128, the quantity of light of the beams of light 126 reaching the optical information medium is reduced, thus making it impossible sometimes to irradiate the beams of light emitted from the semiconductor laser sufficiently onto the optical information medium efficiently. It is possible to improve the utilization efficiency of the beams of light if generation of these diffracted beams of light 127 and 128 can be suppressed.

Figure 12:
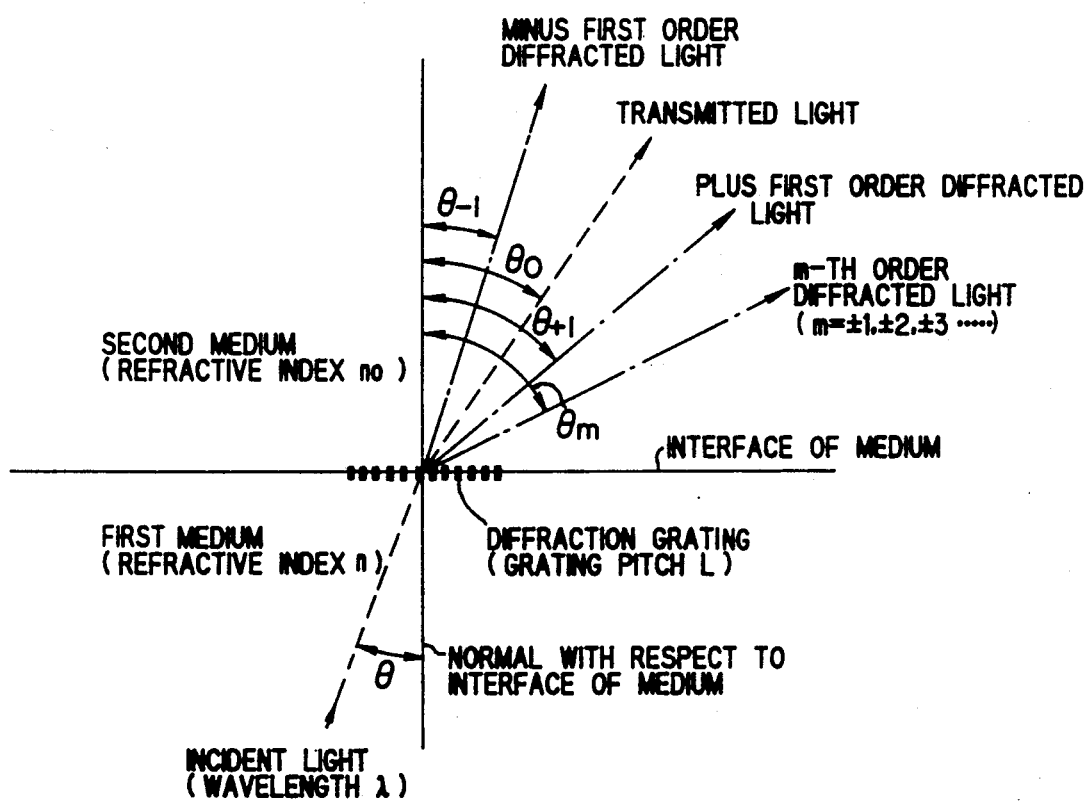
FIG. 12 is a view useful for explaining the status of diffraction of beams of light in FIG. 10 and FIG. 11 in more detail.

A technique for suppressing generation of the diffracted beams of light 127 and 128 will be described hereafter. In FIG. 12, angles at which a beam of light incident to a diffraction grating located at a border between two media for propagation of beams of light are emitted from the diffraction grating are shown.

Respective angles $\theta_0$, $\theta_{+1}$ and $\theta_{-1}$ of a zero order diffracted beam of light (transmitted beam of light), a plus first order diffracted beam of light and a minus first order diffracted beam of light are expressed by the following expressions (20), (21) and (23), and $\theta_m$ is expressed by an expression (25) in general. Here, $m = \pm 1, \pm 2, \pm 3, \ldots,$. Under the condition that the expression (22) is effected, the plus first order diffracted beam of light does not exist, and under the condition that the expression (24) is effected, the minus first order diffracted beam of light does not exist. In general, when an expression (26) is effected, the m-th order diffracted beam of light does not exist.

$$\theta_0 = \sin^{-1}\left(\frac{n_0}{n} \sin \theta\right) \quad (20)$$

Here, $\left|\frac{n_0}{n} \sin \theta\right| \leq 1$ $$\theta_{+1} = \sin^{-1}\left(\frac{n_0}{n} \sin \theta + \frac{\lambda}{n_0 L}\right) \quad (21)$$

However, no diffraction occurs when $$\left|\frac{n_0}{n} \sin \theta + \frac{\lambda}{n_0 L}\right| \geq 1 \quad (22)$$

$$\theta_{-1} = \sin^{-1}\left(\frac{n_0}{n} \sin \theta - \frac{\lambda}{n_0 L}\right) \quad (23)$$

However, no diffraction occurs when $$\left|\frac{n_0}{n} \sin \theta - \frac{\lambda}{n_0 L}\right| \geq 1 \quad (24)$$

$$\theta_m = \sin^{-1}\left(\frac{n_0}{n} \sin \theta + \frac{\lambda}{n_0 L} m\right) \quad (25)$$

However, no diffraction occurs when $$\left|\frac{n_0}{n} \sin \theta + \frac{\lambda}{n_0 L} m\right| \geq 1 \quad (26)$$

In order to apply FIG. 12 to FIG. 10, it is only required to replace the first medium in FIG. 12 with the substrate in FIG. 10 and the second medium in FIG. 12 with the space outside the substrate (usually air) in FIG. 10. Here, it is only required to arrange so as to include the expressions (22) and (24) and to have the expression (20) effected in order to include the plus first order diffracted beam of light and the minus first order diffracted beam of light and that any m-th order diffracted beam of light $(m = \pm 1, \pm 2, \pm 3, \pm 4, \ldots,)$ does not generate. It is possible to prevent any m-th order diffracted beam of light from generating, thereby to prevent generation of the diffracted beams of light 126 and 128 shown in FIG. 10 by determining respective design parameters (L, $\theta$, $n_0$, n, $\lambda$) so that those expressions are effected. It should be noted that the plus first order diffracted beam of light and the minus order diffracted beam of light only are shown in FIG. 10, but that the same is applicable generally with respect to an m-th order diffracted beam of light. By determining the construction of the optical system as described above, there are such effects that the beams of light emitted from the semiconductor laser may be irradiated sufficiently to the optical information medium efficiently, and stabilization of signal read-write operation and miniaturization of the semiconductor laser may be projected.

Next, in FIG. 11, beams of light 110 that are reflected by the optical information medium 20 in FIG. 1 and formed into parallel beams of light by the lens 3b in FIG. 1 are incident to the diffraction grating 12b, and one part thereof transmit through the diffraction grating 12b and becomes zero order beams of light 111. Also, another part thereof is diffracted and becomes minus first order diffracted beams of light 112. Further, still another part thereof becomes first order diffracted beams of light 130. Here, the beams of light that are incident to the photodetectors 6a through 6e in FIG. 1 and create effective signals practically are the minus first order diffracted beams of light 112, and other beams of light 111 and the plus first order diffracted beams of light 130 are unnecessary beams of light. The unnecessary beams of light 111 may be excluded efficiently outside the substrate by the method described with reference to FIG. 9. The unnecessary beams of light (plus first order diffracted beams of light) 129 are incident to the photodetector 6c directly or reflected by the bottom face of the substrate to become reflected beams of light 130. Because of the reason that the reflected beams of light 130 are incident to the photodetector 6c, there is a possibility that the S/N ratio of the signal detected by the photodetector is aggravated.

It is now considered how to prevent the plus first order diffracted beams of light 129. Here, in order to apply FIG. 12 to FIG. 11, the first medium in FIG. 12 is selected for the medium outside the substrate (usually air) in FIG. 11, and the second medium in FIG. 12 is selected for the substrate in FIG. 10. In such a case, it is required that the expression (22) is not effected but the expression (24) is effected in FIG. 12 in order that the minus first order diffracted beams of light are produced but the plus first order diffracted beams of light are not generated. There are such effects that the plus first order diffracted beams of light 129 and the reflected beams of light 130 shown in FIG. 11 may be prevented and aggravation of the S/N ratio of the signal detected by the photodetector is also prevented, thereby to maintain always high optical performance, by calculating values of L, $\theta$, $n_0$, and $\lambda$ according to these expressions and designing the construction of the diffraction grating based on these values.

Next, the installation technique of photodetectors 6a through 6e in FIG. 1 will be explained with reference to FIG. 13. FIG. 13 has been drawn up with a part of FIG. 1 omitted. The waveguide 2 is installed on the substrate 1. Here, an auxiliary member 1a is fitted to the waveguide 2. This auxiliary member 1a is a block made of glass or metal. The auxiliary member is fixed so that the face on which the photodetectors 6a through 6e are installed approximately even with the auxiliary member 1a, or the face on which the photodetectors 6a through 6e are installed is ground after the auxiliary member is fixed so that the face is approximately even with the auxiliary member. When the photodetectors 6a through 6e are mounted on this face after completing the above, there is such an effect that it is possible to fit photodetectors stably and to maintain a predetermined optical performance for a long period of time since the surface on which the photodetectors are mounted is a plane. In addition, there is such an effect that, when adhesives are used for fixing the photodetectors 6a through 6e, alignment does not get out of order and high optical performance may be realized by simple adjustment even if the adhesives contract attended by the effect of the adhesives.

Depending on the configurations of the photodetectors 6a through 6e, they may be connected only to the substrate 1 by omitting the auxiliary member 1a. In this case, there are such effects that the number of components may be reduced and scattering of the guided beams of light caused by the variation of the effective refractive index of the waveguide 2 by the auxiliary member.

Next, the holding method of the lens 3a in FIG. 1 will be explained with reference to FIG. 14. FIG. 14 is drawn with a part of FIG. 1 omitted. The beams of light emitted from the semiconductor laser 5 are formed into parallel beams of light by the lens 3a which is fitted directly or indirectly by using an auxiliary member 1b to the substrate 1, and are irradiated to the optical information medium 20 through the lens 3b. Since the lens 3a is fixed to the substrate 1, such an effect is obtainable that the relative positions of both components rarely change, thus making it possible to maintain always stable predetermined optical performance. Here, the lens 3a and the auxiliary member 1b may be manufactured separately and fixed thereafter. In this case, such an effect is obtained that the manufacture becomes easier and the manufacturing accuracy is improved because individual manufacturing process can be proceeded independently from each other. Further, both components may also be manufactured in a single body (both components as one component). In this case, such an effect is obtained that the number of whole components is reduced and the reliability is improved. The reason why the auxiliary member 1b is used is to utilize the aperture portion of the lens 3a effectively, thus making it possible to use the lens 3a of the minimum size. Also, the lens 3a may be fixed directly to the substrate 1 without using the auxiliary member 1b. In this case, such an effect that the number of components is reduced and the reliability is improved is obtained. If adhesives which transmit beams of light at the oscillation frequency of the light source is used for fixing the lens 3a to the substrate 1, fixing the lens 3a to the auxiliary member 1b and fixing the auxiliary member 1b to the substrate 1, the adhering method is simple and fixing of high optical performance can be made.

Next, it will be explained how to detect a track error signal, a focus error signal and a readout signal with reference to FIG. 15 through FIG. 21. In FIG. 15 through FIG. 20, the substrate 1 shown in FIG. 1 is perpendicular to the waveguide 20 and those Figures are seen in the direction from the waveguide, and in particular, the vicinity of the photodetectors is shown. And, FIG. 21 shows a signal processing system.

Figure 15:
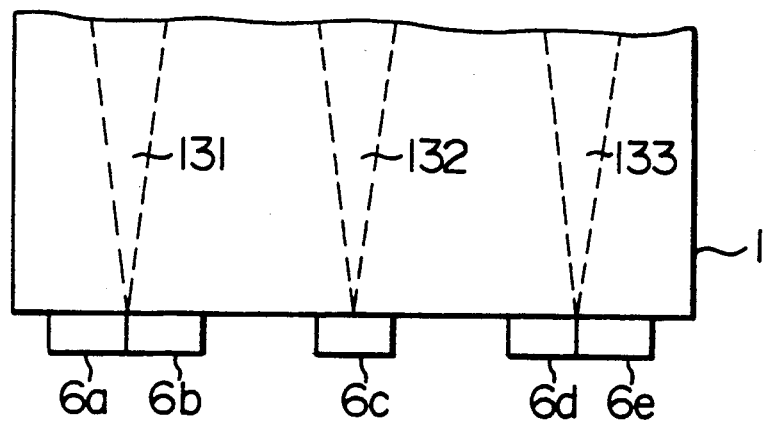
FIG. 15 through FIG. 20 are views useful for explaining the status when beams of light are incident to the photodetector, respectively.

A detecting method of a focus error signal will be explained with reference to FIG. 15 through FIG. 17. FIG. 15 shows a case when the reflecting face of the optical information medium 20 in FIG. 1 is located at the position of the focal point formed by the lens 3b in FIG. 1, in which there is no focus error. Beams of light 131 coupled optically in the grating coupler 11a in FIG. 1 are incident to both photodetectors 6a and 6b installed adjacent to each other while forming a focal point in the vicinity of the border between those photodetectors 6a and 6b. In this case, the signal quantity detected by the photodetector 6a and the signal quantity detected by the photodetector 6b are equal to each other. Conversely speaking, the photodetectors 6a and 6b are installed so that both quantities of light become equal to each other. Further, beams of light 132 coupled optically in the grating coupler 11b are incident to the photodetector 3c. Further, beams of light 133 coupled optically in the grating coupler 11c in FIG. 1 are incident to the photodetectors 6d and 6e installed adjacent to each other while forming a focal point in the vicinity of the border between those photodetectors 6d and 6e. In this case, the signal quantity detected by the photodetector 6d and the signal quantity detected by the photodetector 6e are equal to each other. Conversely speaking, the photodetectors 6d and 6e are installed so that both quantities of light become equal to each other.

Figure 16:
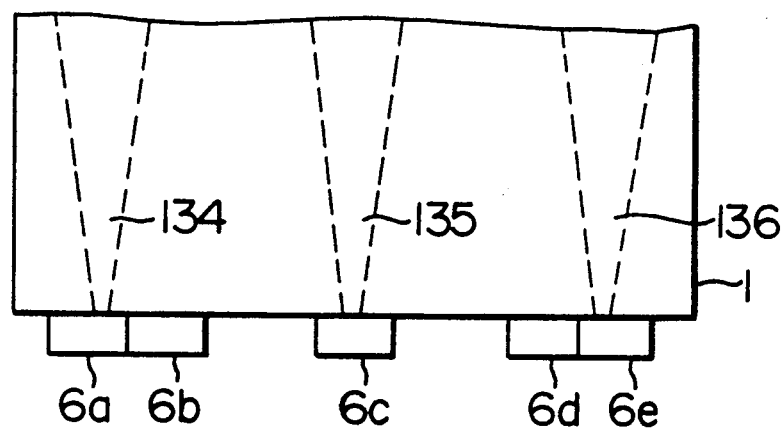

FIG. 16 shows a case where the optical information medium 20 is located closer to the substrate 1 than the position of the focal point formed by the lens 3b in FIG. 1, in which a focus error exists. Beams of light 134 coupled optically in the grating coupler 11a in FIG. 1 are incident to the photodetectors 6a and 6b installed adjacent to each other while forming a focal point in the vicinity of the border between those photodetectors 6a and 6b. In this case, the beams of light 134 are deflected to the side where the photodetector 6a is located, and the light quantity detected by the photodetector 6a is larger than the light quantity detected by the photodetector 6b. Further, beams of light 135 coupled optically in the grating coupler 11b are incident to the photodetector 6c. Further, beams of light 136 coupled optically in the grating coupler 11c are incident to the photodetectors 6d and 6e installed adjacent to each other while forming a focal point in the vicinity of the border between those photodetectors 6d and 6e. In this case, the beams of light 136 are deflected to the side where the photodetector 6e is located, and the light quantity detected by the photodetector 6e is larger than the light quantity detected by the photodetector 6d.

Figure 17:
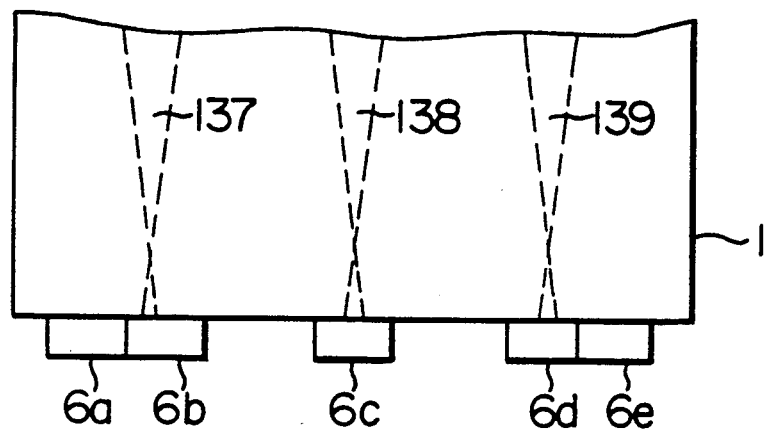

FIG. 17 shows a case where the optical information medium 20 in FIG. 1 is located on the side farther from the substrate 1 than the position of the focal point formed by the lens 3b in FIG. 1, in which there is a focus error having a sign reverse to that in the case of FIG. 16. Beams of light 137 coupled optically in the grating coupler 11a in FIG. 1 are incident to the photodetectors 6a and 6b installed adjacent to each other while foraming a focal point in the vicinity of the border between those photodetectors 6a and 6b. In this case, the beams of light 137 are deflected to the side where the photodetector 6b is located, and the light quantity detected by the photodetector 6b is larger than the light quantity detected by the photodetector 6a. Further, beams of light 138 coupled optically in the grating coupler 11b in FIG. 1 are incident to the photodetector 6c. Further, beams of light 139 coupled optically in the grating coupler 11c in FIG. 1 are incident to the photodetectors 6d and 6e installed adjacent to each other while forming a focal point in the vicinity of the border between those photodetectors 6d and 6e. In this case, the beams of light 139 are deflected to the side where the photodetector 6d is located, and the light quantity detected by the photodetector 6d is larger than the light quantity detected by the photodetector 6e.

From the foregoing, a focus error signal is obtained by calculating either the difference in the outputs of the photodetectors 6a and 6b or the difference in the outputs of the photodetectors 6d and 6e. Otherwise, it may also be obtained by calculating either the ratio of the outputs of the photodetectors 6a and 6b or the ratio of the outputs of the photodetectors 6d and 6e. In this case, there is such an effect that, even if the sum of the outputs of the photodetectors 6a and 6b is varied because of the light quantity variation of the light source, the variation of the reflectance ratio of the optical information medium, the tracking error and the like or the sum of the outputs of the photodetectors 6d and 6e is varied because of the same reasons, it is possible to eliminate the influence thereof from the focus error signal. Otherwise, the sum of the outputs of the photodetectors 6b and 6d may be subtracted from the sum of the outputs of the photodetectors 6a and 6e as shown in FIG. 21. In this case, such an effect is obtained that the influence of the track error signal may be removed from the focus error signal.

In FIG. 21, respective signals from the photodetectors 6a through 6e are amplified by preamplifiers 50 and processed by means of subtractors 53 and a subtractor 54. This signal is used as the focus error signal. This focus error signal is subject to the influence by light quantity variation of the semiconductor laser 5 in FIG. 1, the influence of the variation of the reflectance factor of the optical information medium 20 in FIG. 1 and the influence of other variations. Thus, it is possible to obtain a focus error signal having less variation by normalizing the focus error signal (dividing the focus error signal by the result of addition) by means of an Automatic Gain Control circuit (AGC) 59 based on the result obtained by adding the outputs of all the photodetectors by an adder 57.

Next, a detecting method of the track error signal will be explained with reference to FIG. 18 and FIG. 20.

Figure 18:
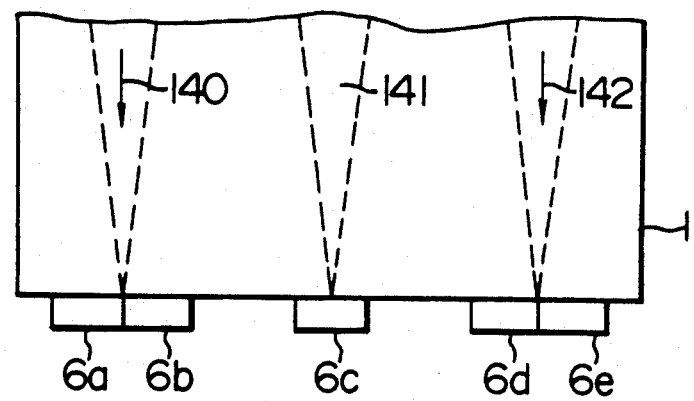

FIG. 18 shows a case in which a track (a train in which information bits are arranged) on the optical information medium 20 in FIG. 1 is located at the position of the focal point formed by the lens 3b in FIG. 1, in which there is no track error. Beams of light 140 coupled optically in the grating coupler 11a in FIG. 1 are incident to the photodetectors 6a and 6b installed adjacent to each other while forming a focal point in the vicinity of the border between those photodetectors 6a and 6b. Further, beams of light 141 coupled optically in the grating coupler 11b in FIG. 1 are incident to the photodetector 6c. Further, beams of light 142 coupled optically in the grating coupler 11c in FIG. 1 are incident to the photodetectors 6d and 6e installed adjacent to each other while forming a focal point in the vicinity of the border between those photodetectors 6d and 6e. In this case, the light quantity of the beams of light 140 and the light quantity of the beams of light 142 are equal to each other.

Figure 19:
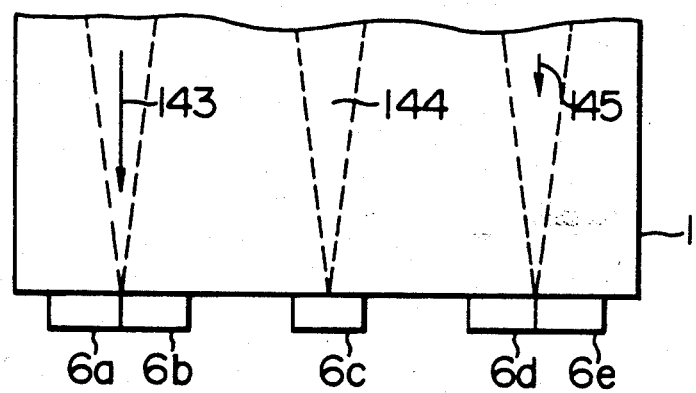

FIG. 19 shows a case in which the track on the optical information medium 20 in FIG. 1 is not located at the position of the focal point formed by the lens 3b in FIG. 1, but slips out of the place appreciably, in which there is a track error. Beams of light 143 coupled optically in the grating coupler 11a in FIG. 1 are incident to the photodetectors 6a and 6b installed adjacent to each other while forming a focal point in the vicinity of the border between those photodetectors 6a and 6b. Further, beams of light 144 coupled optically in the grating coupler 11b in FIG. 1 are incident to the photodetector 6c. Further, beams of light 145 coupled optically in the grating coupler 11c in FIG. 1 are incident to photodetectors 6d and 6e installed adjacent to each other while forming a focal point in the vicinity of the border between those photodetectors 6d and 6e. In this case, the light quantity of the beams of light 143 is larger than the light quantity of the beams of light 145.

Figure 20:
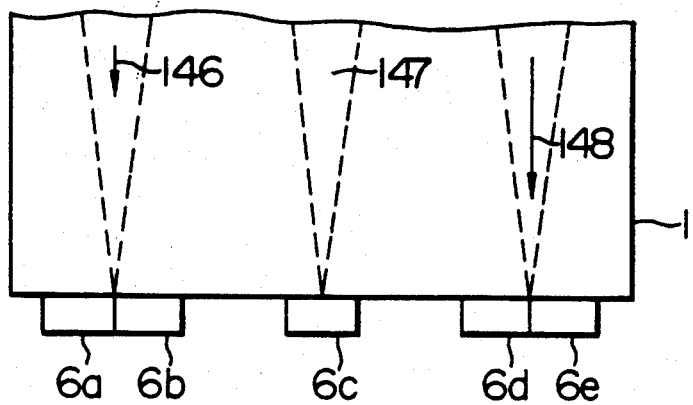
Figure 21:
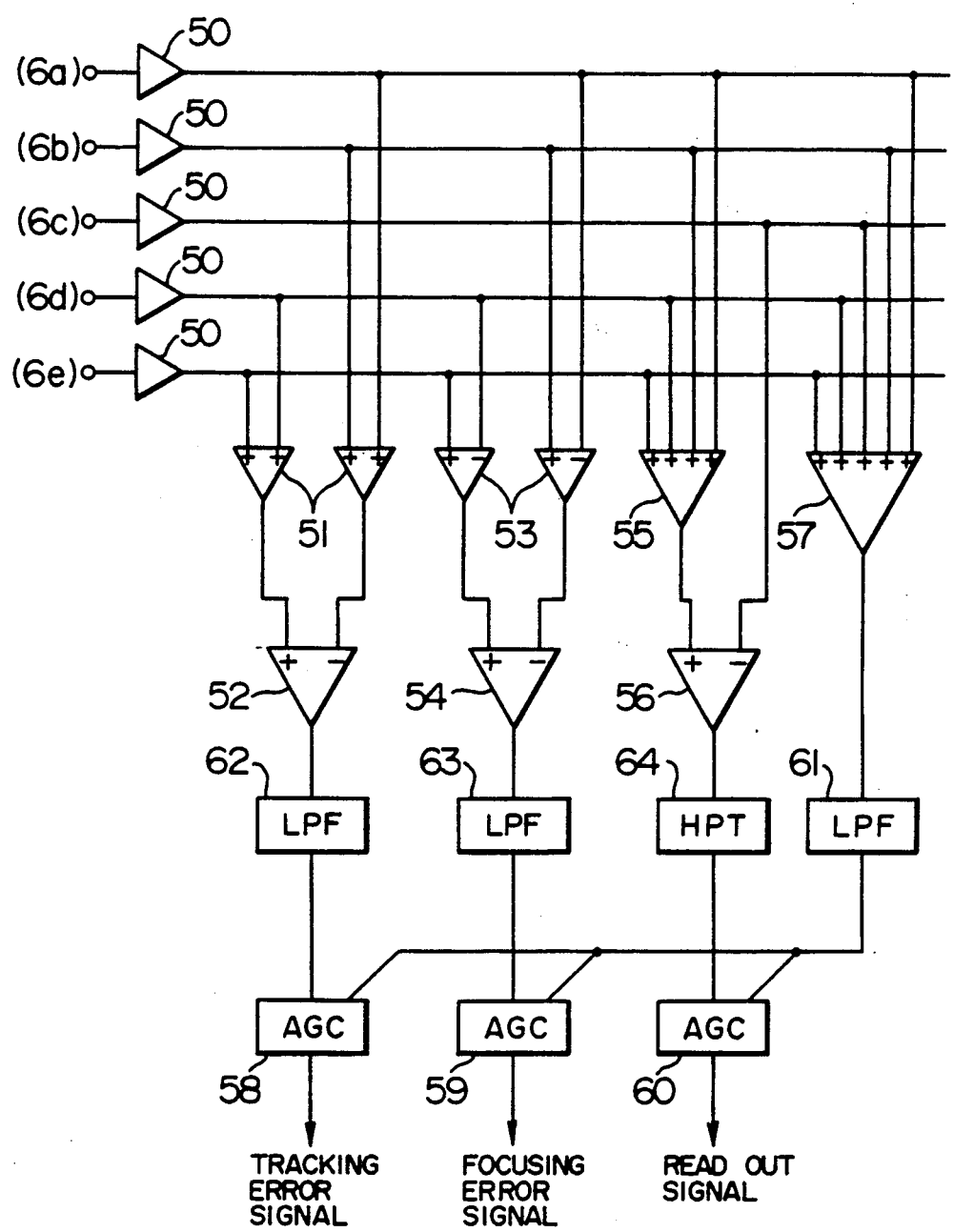
FIG. 21 is a block diagram of a signal processing circuit which processes the output from the photodetector.

FIG. 20 shows a case in which the track in which information bits on the optical information medium 20 in FIG. 1 are arranged is not located at the position of the focal point formed by the lens 3b in FIG. 1, but slips out of the place appreciably in the reverse direction of that in the case of FIG. 19, in which there is a track error. Beams of light 146 coupled optically in the grating coupler 11a in FIG. 1 are incident to the photodetectors 6a and 6b installed adjacent to each other while forming a focal point in the vicinity of the border between those photodetectors 6a and 6b. Further, beams of light 147 coupled optically in the grating coupler 11c in FIG. 1 are incident to the photodetector 6c. Further, beams of light 148 coupled optically in the grating coupler 11c in FIG. 1 are adjacent to each other while forming a focal point in the vicinity of the border between those photodetectors 6d and 6e. In this case, the light quantity of the beams of light 148 is larger than the light quantity of the beams of light 146.

From the foregoing, a track error signal is obtainable by detecting the difference between the result obtained by adding signals detected by the photodetectors 6a and 6b and the result obtained by adding signals detected by the photodetectors 6d and 6e, and a signal processing method such as shown in FIG. 21 is used.

Now returning to FIG. 21, respective signals from the photodetectors 6a through 6e that have been amplified by the preamplifiers 50 are processed by adders 51 and a subtractor 52. This signal is used as the tracking error signal. This tracking error signal is subject to the influence of the light quantity variation of the semiconductor laser 50 in FIG. 1, the influence of the variation of the reflection ratio of the optical information medium 20 in FIG. 1 and the influence of other variations. Thus, it is possible to obtain a tracking error signal having less variation by normalizing the tracking error signal (dividing the tracking error signal by the result of addition) by means of the automatic gain control circuit 58 based on the result obtained by adding the outputs of all the photodetectors with the adder 57.

In FIG. 21, an example of said focus error signal detection, track error signal detection and readout signal detection circuits. A readout signal is obtained by processing signals by means of an adder 55 and a subtractor 56. If an automatic gain control circuit 60 is used at need, however, it is possible to prevent aggravation of signal characteristics caused by various variation factors. Further, a low-pass filter 61 may also be used as occasion demands for the processing result of the adder 57 which is sent to automatic gain control circuits 58 through 60. By doing so, such an effect is obtained that it is possible to prevent application of more high frequency components than required to the automatic gain control circuits 58 through 60, thereby to improve signal characteristics. Further, it is possible to process signals of the result of an adder 52 or the result of an adder 54 by using low-pass filters 62 and 63, respectively. By doing so, such an effect is obtained that the readout signal is superposed on the track error signal and the focus error signal, thereby to improve signal characteristics. The same is also applied when those low-pass filters are used after the automatic gain control circuits 58 and 59. Also, it is possible to process the signal by using a high-pass filter 64 on the operation result of the subtractor 56. By doing so, there is such an effect that it is possible to eliminate the influence of the drift and the influence of other noise, etc. of various signal processing circuits from the readout signal, thereby to improve signal characteristics. Further, such an effect is obtained that signal characteristics can be improved further by using a band-pass filter which covers the frequency band of the readout signal in place of the high-pass filter. The improvement of these signals can be achieved in a similar manner when these are connected to the automatic gain control circuit 60.

Figure 22:
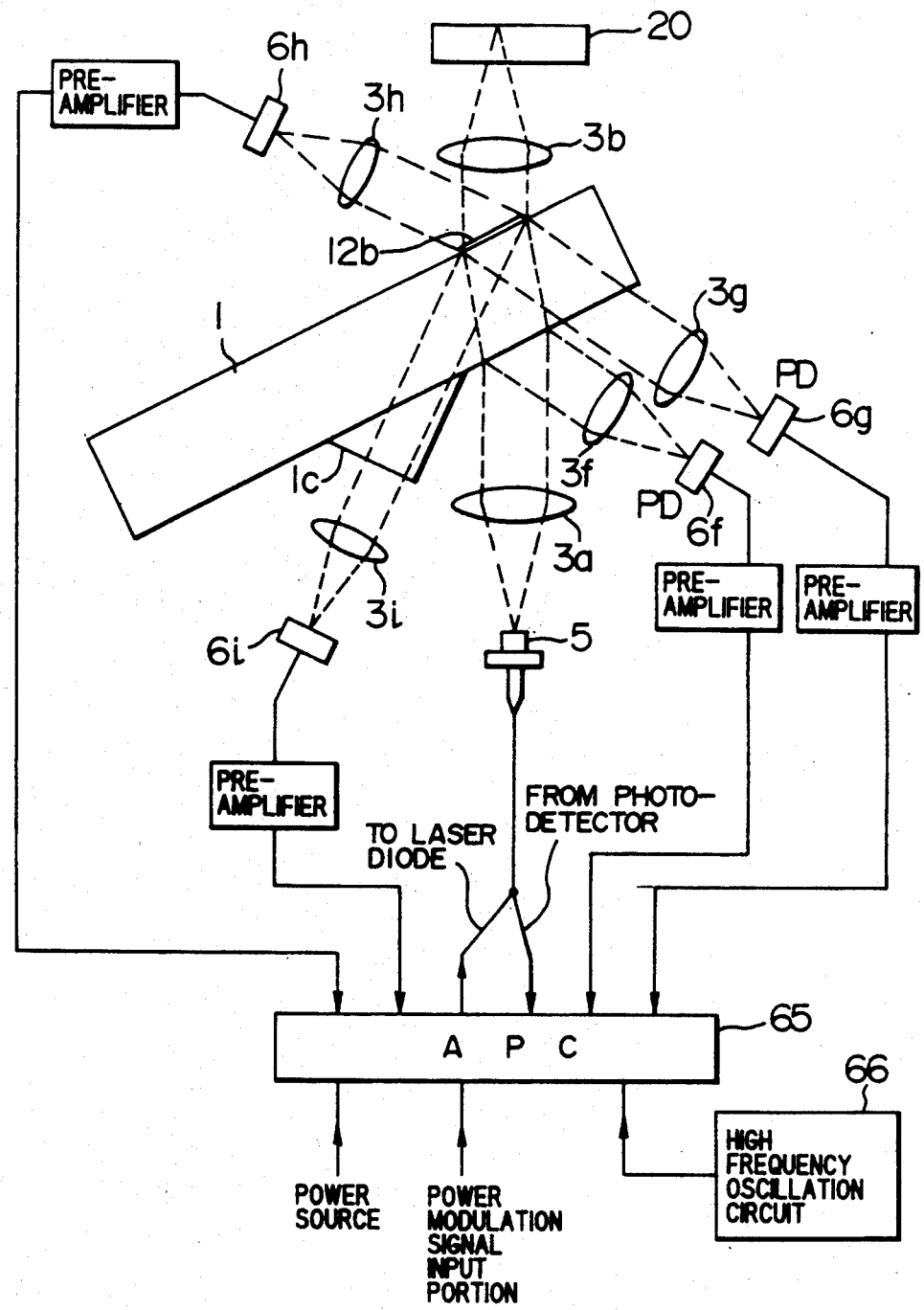
FIG. 22 is a block diagram showing a driving method of a semiconductor laser.

Next, a control method of the semiconductor laser 5 will be explained with reference to FIG. 22. In FIG. 22, the beams of light emitted from the semiconductor laser 5 are formed into parallel beams of light by the action of the lens 3a, converged by the lens 3b after passing through the substrate 1, and form a focal point on the optical information medium 20. It is important to set the quantity of light irradiated onto the optical information medium 20 to an expected value correctly for preventing degrading of signals during the process of signal processing described with reference to FIG. 15 through FIG. 21. Therefore, it is preferred that Automatic Power Control (APC) is performed on the semiconductor laser 5 by avoiding unexpected variation of the light quantity and obtaining an effect of maintaining the grade of the signal. This is to control the current injected to the semiconductor laser 5 by feedback so that the light quantity oscillated at the semiconductor laser 5 is detected and this light quantity is set always to an expected value.

There is a method by a photodetector mounted in the package of the semiconductor laser 5 for detecting the light quantity oscillated in the semiconductor laser 5. In this case, such an effect is obtained that the whole device is miniaturized because the photodetector is packaged in the semiconductor laser.

There is another method of detecting the light quantity oscillated in the semiconductor laser 5. In this method, when beams of light emitted from the semiconductor laser 5 and formed into parallel beams of light by the lens 3a are reflected by the bottom face of the substrate 1, these reflected beams of light are detected by a photodetector 6f. By doing so, it is not required to insert a beam splitter for leading beams of light to the photodetector into an optical path (a portion where beams of light are propagated), thus obtaining effects of not only reducing the number of components, but also miniaturizing the device. When beams of light are incident to the photodetector 6f, beams of light may also be converged by using a lens 3f. In such a case, beams of light may be incident to the photodetector effectively even if the area of the light receiving portion of the photodetector 6f is small. Therefore, there are not only such an effect that the photodetector may be miniaturized so that the device may be miniaturized, but also an effect of improving the sensitivity in photodetection.

There is another method of detecting the light quantity oscillated in the semiconductor laser 5, in which, when beams of light emitted from the semiconductor laser 5 and formed into parallel beams of light by the lens 3a are reflected by the waveguide surface, these reflected beams of light are detected by a photodetector 6g. By doing so, there are not only such an effect that it is not required to insert a beam splitter for leading beams of light to the photodetector into an optical path, thus reducing the number of components, but also an effect that the device may be miniaturized. When beams of light are incident to the photodetector 6g, beams of light may be converged by using a lens 3g, too. In such a case, beams of light may be incident to the photodetector effectively even if the area of the light receiving portion of the photodetector 6g is small. Therefore, there are not only such an effect that the photodetector may be miniaturized so that the device is miniaturized, but also an effect of improving the sensitivity in photodetection.

There is still another method of detecting the light quantity oscillated in the semiconductor laser 5, in which, when beams of light emitted from the semiconductor laser 5 and formed into parallel beams of light by the lens 3a are diffracted by the diffraction grating 12b, these diffracted beams of light are detected by a photodetector 6h. The diffracted beams of light 128 shown in FIG. 10 are used in this case. In the explanation of FIG. 10, it was described that the diffraction grating 12b might be designed so that the diffracted beams of light 128 are not generated. When these diffracted beams of light 128 are used, however, constructions of respective parts are designed under such conditions that diffracted beams of light are generated. With such constructions, there are not only such an effect that it is not required to insert a beam splitter for leading beams of light to the photodetector into an optical path and the number of components may be reduced, but also the device can be miniaturized. When beams of light are incident to the photodetector 6h, beams of light may be converged by using a lens 3h. In such a case, it is possible to make beams of light be incident to the photodetector effectively even when the area of the light receiving portion of the photodetector 6h is small. Thus, there are not only such an effect that the photodetector is miniaturized so that the device is miniaturized, but also an effect of improving the sensitivity in photodetection.

There is also a different method of detecting the light quantity oscillated in the semiconductor laser 5, in which, among those beams of light that are emitted from the semiconductor laser 5, reflected by the optical information medium 20 and diffracted by the diffraction grating 12b, the beams of light 12g shown in FIG. 11 5 are detected by a photodetector 6i. In the explanation of FIG. 11, it was described that the diffraction grating 12b might also be designed so that the diffracted beams of light 129 are not generated. When these diffracted beams of light 129 are used, however, constructions of respective parts designed under such conditions that diffracted beams of light are generated. With such constructions, there are not only such an effect that it is not required to insert a beam splitter for leading beams of light to the photodetector into an optical path (a portion where beams of light are propagated) and the number of components may be reduced, but also an effect that the device may be miniaturized. When beams of light are incident to the photodetector 6i, diffracted beams of light which pass through the underside of the substrate may be received directly. In this case, such an effect that the construction becomes simpler is obtained. Further, when the intensity of the transmitted light is insufficient due to total reflection by the underside of the substrate and so on, it is possible to fix the auxiliary member 1c to the substrate 1 and make beams of light transmit through the underside of the substrate effectively. In this case, such an effect is obtained that the light utilization efficiency is improved. Further, it is possible to use the auxiliary member 1c made of the same material as that of the substrate 1. In this case, since there is no difference in refractive indices of the auxiliary member 1c and the substrate 1, such an effect is obtained that the light transmission factor is improved. For fixing the auxiliary member 1c with the substrate 1, adhesives which transmit light at the wavelength of the light source may be used. By doing so, there is such an effect that the positional relationship between the auxiliary member 1c and the substrate 1 is stabilized, thus improving reliability for a long period of time. Also, beams of light may be converged by using a lens 3i. By doing so, it is possible to make beams of light be incident to the photodetector effectively even when the area of the light receiving portion of the photodetector 6i is small. Thus, there are not only such an effect that the photodetector is miniaturized so that the device is miniaturized, but also an effect of improving the sensitivity in photodetection.

Using one or any two or more methods among those that are described above, the intensity of the light oscillated by the semiconductor laser 5 is measured. The result of measurement is fed back to an automatic power control circuit 65 so as to stabilize the light quantity oscillated by the semiconductor laser 5.

When information is loaded in the optical information medium, a light modulation signal input portion which is able to adjust to any value or modulate the light quantity of the semiconductor laser is provided in the automatic power control circuit 65. The operation for loading a signal in the optical information medium will be described later.

It is possible to provide a high frequency oscillator 66 so as to input a high frequency to the automatic power control circuit 65 and to superpose the high frequency to the injected current to the semiconductor laser 5. By such high frequency superposition, such an effect is obtained that the operation of the semiconductor laser 5 is stabilized. Here, the frequency oscillated by the high frequency oscillator 66 is made to fall within a wavelength band different from the wavelength band of the signal which is output from the signal processing system shown in FIG. 21. With this, it is possible to remove signals of the oscillation frequency of the high frequency oscillator 66 out of the signals from the signal processing unit shown in FIG. 21, thus obtaining such an effect that high frequency may be superposed stably while maintaining the grade of the signal.

When a high frequency is superposed to the injected current in case the semiconductor laser 5 is a single mode laser, it happens sometimes that the oscillation mode turns to a multimode. Including a case that a multimode laser is used for the semiconductor laser 5, the emitted light from the laser has a comparatively wide oscillation wavelength band in the case of multimode oscillation. When a laser beam in multimode is made to be incident to the grating coupler, the wavelength band of beams of light which can be coupled optically is smaller than the oscillation wavelength band in multimode sometimes when coupling condition of the grating coupler is considered. In such a case, since beams of light other than the wavelength band of beams of light that are coupled optically cannot be coupled, the light utilization efficiency is lowered. On the other hand, in an optical integrated circuit in which a counter-move against wavelength variation is devised with a supplementary diffraction grating 12b as shown in FIG. 3, beams of light can be coupled in a wide wavelength band. Therefore, there are such an effect that the light utilization efficiency can be increased even when a multimode laser is used, and in addition, an effect that laser noise may be reduced and the return light preventive device for the laser may be simplified by using the multimode laser. Here, the return light means light which returns to the laser after being reflected by optical components and the like outside the laser among beams of light emitted from the laser. This return light will cause variation of the quantity and the wavelength of beams of light oscillated by the laser (laser noise).

In FIG. 21, the processing results by the adder 57 were used as the tracking error signal, the focusing error signal, and signals used in normalizing readout signals in the automatic gain control circuits 58 through 60. As the signal source for such normalization, it is possible to use one or a plurality of outputs among the outputs from the photodetectors 6f, 6g, 6h and 6i shown in FIG. 22 instead of the output of the adder 57 shown in FIG. 21. In this case, such an effect is obtained that the signal processing system shown in FIG. 21 may be simplified.

Figure 23:
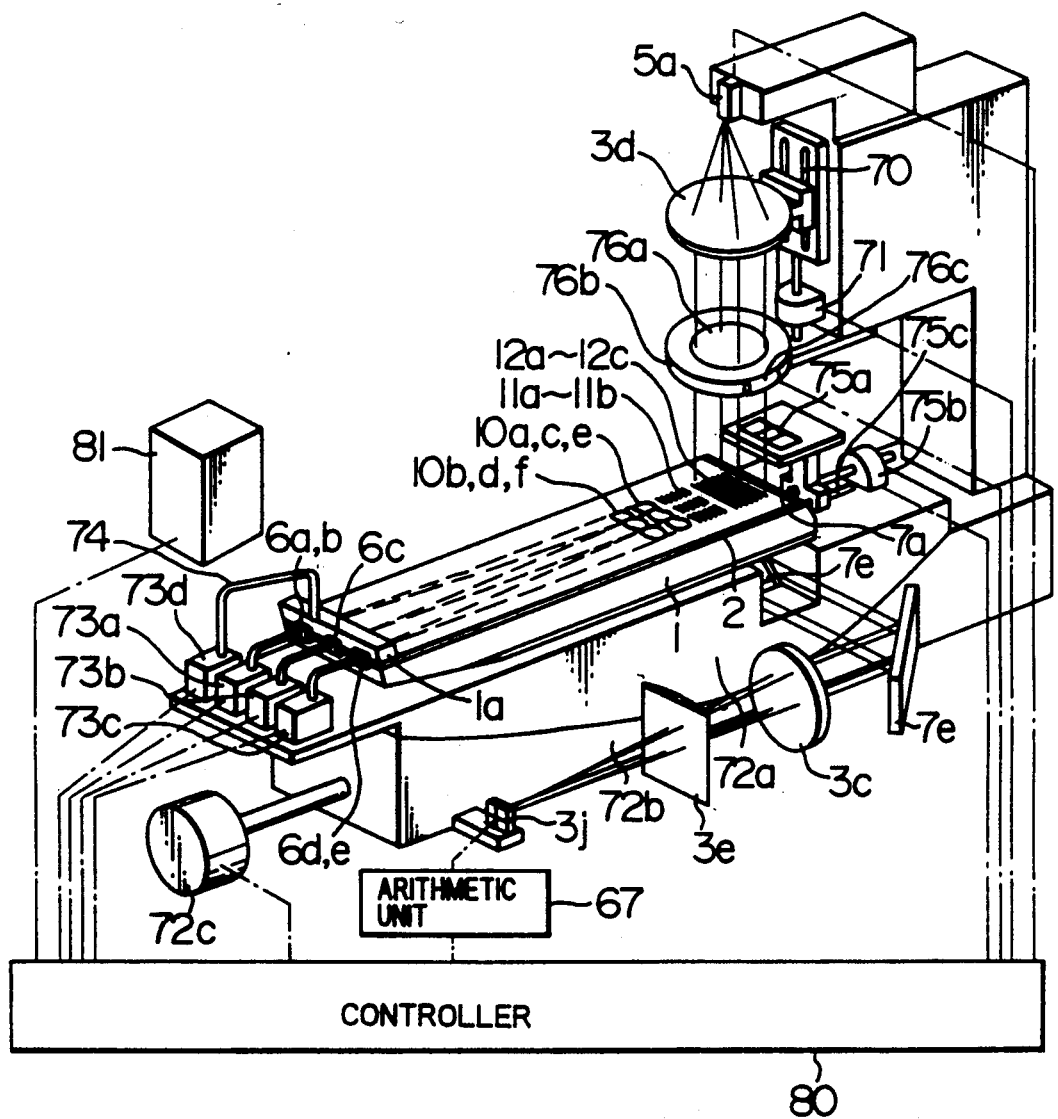
FIG. 23 is a perspective view of an adjusting device for adjusting the optical system according to the present invention.

Next, an adjusting device of the present embodiment will be explained with reference to FIG. 23. FIG. 23 is a perspective view of the adjusting device. In FIG. 23, beams of light emitted from a light source 5a pass through a lens 3d. Here, it is preferred to use a laser for the light source 5a. Also, this lens 3d is installed on a rectilinear guide mechanism 70 which is movable in the light proceeding direction. By driving this lens with an actuator 71, it is possible to form beams of light from the lens 3d in parallel beams of light, divergent beams of light, or convergent beams of light. The beams of light which pass through the lens 3d are incident to the diffraction gratings 12a, 12b and 12c and transmit therethrough partly without being diffracted. These beams of light transmit through the waveguide 2 and the substrate 1 and are emitted outside the substrate, and then deflected at need by using a reflecting mirror 7e and the like. These beams of light form a focal point by the action of a lens 3c and a cylindrical lens 3e and are incident to a four-division photodetector array 3j which is installed in the vicinity of the focal point. The position of the focal point of beams of light that are converged by the lens 3c and the cylindrical lens 3e is varied depending on whether the beams of light which have transmitted through the lens 3d are parallel beams of light, divergent beams of light or convergent beams of light. This variation of the focal point position becomes the variation of the ratio of the quantity of beams of light that are incident to respective photodetectors of the photodetector array 3j by the astigmatism of the cylindrical lens 3e. With this, it is possible to know the quantity of the astigmatism on the photodetector array 3j by processing the output from this photodetector array 3j with an arithmetic unit 67, thereby to learn the focal point position by the lens 3d and the cylindrical lens 3e. With these values, it can be judged quantitatively that the beams of light that have passed through the lens 3d are parallel beams of light, divergent beams of light or convergent beams of light, and it is also found whether the beams of light that are incident to the grating couplers 12a through 12c are parallel beams of light, convergent beams of light or divergent beams of light.

The output of the arithmetic unit 67 is taken into a controller 80. It is made possible to form the beams of light that pass through the lens 3d optionally into parallel beams of light, divergent beams of light or convergent beams of light by the controller 80 driving the actuator 71 based on this information.

In an element integrated on the substrate 1, adjustment is not required for portions formed in a monolithic construction. However, when photodetectors 6a through 6e are components attached externally (The substrate 1, the waveguide 2 or those components that are attached to those parts that are attached to the substrate 1, the waveguide 2 and the like using adhesives or auxiliary fixtures in a monolithic construction are referred to as components attached externally. A reflecting film, an antireflection film and the like on the substrate 1 are deemed to be monolithic component.), it is required to adjust fitting and fitting positions of these attached components.

The adjustment of the position of the photodetectors is performed according to the points as follows. Under such a state that monolithic components are fitted but the photodetector is not fitted, the substrate 1 is fixed to a jogging table 72a. The jogging table 72a is rotated by being combined with a jogging table 72b, thus adjusting incident angles of beams of light that are incident to the diffraction gratings 12a through 12c. These jogging tables 72a and 72b are operated by means of an actuator 72c connected to the controller 80. The photodetectors 6a and 6b are picked up from a parts supply table by means of a three-dimensional movable carriage 73a which is capable of component chuck, and are placed in the vicinity of the end face of the substrate 1. Further, the photodetector 6c is picked up from a parts supply table by means of a three-dimensional movable carriage 73b which is capable of component chuck, and are placed in the vicinity of the end face of the substrate 1. Also, the photodetectors 6d and 6e are picked up from a parts supply table by means of a three-dimensional movable carriage 73c which is capable of component chuck, and are placed in the vicinity of the end face of the substrate 1. The signal processing circuit shown in FIG. 21 is connected to respective photodetectors.

The beams of light which have passed the lens 3d are set to parallel beams of light by adjusting the actuator 71, and are then made to be incident to the diffraction gratings 12a through 12c. A part of beams of light which are incident here is diffracted and becomes beams of light which are propagated in the waveguide 2 provided on the substrate 1 by means of the reflecting film 7a, the grating couplers 11a, 11b and 11c and so forth as explained with reference to FIG. 1 through FIG. 3. The beams of light converged by the lenses 10a through 10f are emitted from the end face of the substrate 1, and a part of the beams of light is incident to the photodetectors 6a through 6e. The jogging table 72a is adjusted so that the sum of signals detected by respective photodetectors reaches the maximum, thereby to adjust incident angles of the beams of light on the diffraction gratings 12a through 12c. After this maximum point is obtained, the three-dimensional movable carriages 73a and 73c are driven so as to adjust the positions of the photodetectors finely while making beams of light be incident to the photodetectors 6a, 6b, 6d and 6e so that the tracking error signal and the focus error signal in FIG. 21 show neutral values, viz., values corresponding to the status of no error. Further, the position of the photodetector 6c is adjusted so that the independent output thereof becomes the maximum. After the positional fine adjustment is completed, adhesives are applied to the substrate and the photodetectors 6a through 6e by a discharge unit 74 mounted on a three-dimensional movable carriage 73d, and the photodetectors are fixed by curing of adhesives. It may also be planned to promote curing of adhesives by irradiating an electromagnetic wave (infrared radiation, visible light, electron beam and other energy) generated from an irradiation device 81 in curing the adhesives. In this case, such an effect is obtained that the adhesive strength is increased and the time required for adhesion can be shortened. Further, an auxiliary member 1a such as shown in FIG. 13 may also be used for fitting the photodetectors 6a through 6e. It is possible to increase adhesive strength in adhesion by adhering the auxiliary member 1a to the substrate 1 and applying adhesives to the substrate 1, the photodetectors 6a through 6e and the auxiliary member 1a. In this case, there is such an effect that fitting strength of the photodetectors is increased and stable optical performance can be maintained for a long period of time.

It is recommendable that an adhesive that is a material which transmits light with a small attenuation factor (referred to as a translucent substance) in the wavelength band of the light source is employed for adhesives fixing the photodetectors. In this case, there is such an effect that, even if adhesives exist in the optical path, loss of light is small and assembly is simplified.

Further, it is possible to adopt a technique by welding in which either heat or pressure or both are used at the same time in addition to a technique by adhesives for adhering the photodetectors to the substrate or further to the auxiliary member. One of these techniques is anodic bonding (a technique in which pressure is applied to glass and metal thereby to joint both on a molecular level). According to such a technique including others, there is such an effect that adhesives are not required and reliability of an adhered portion is improved.

It is possible to evaluate optical characteristics by simulating the actual operating state after the photodetectors are fitted. Simulation in case a focus error is generated is performed by moving the lens 3d using the actuator 71. Otherwise, although it is not shown in FIG. 23, similar simulation can be performed by fixing the lens 3d, forming the light source 5a in such a construction that is movable in the optical axis direction and varying the position of the light source 5a. Further, simulation of a tracking error is performed in such a manner that a light attenuator 75a is inserted by using an actuator 75b and a rail 75c in one or both of the path from the light source 5a to the diffraction grating 12a and the path from the light source 5a to the diffraction grating 12c, and the ratio of the light quantity incident to the diffraction grating 12a and the light quantity incident to the diffraction grating 12c is varied. Also, simulation of a readout signal is performed in such a manner that a wave plate using an actuator 76c. With these simulation devices, it is possible to evaluate the performance of an optical system at the time of actual operation and to obtain products having satisfactory performance selectively, thus achieving such an effect of improving product reliability.

It is also possible to perform such evaluation before all of the photodetectors 6a through 6e are adhered, and to determine the fitting positions of the photodetectors 6a through 6e also with the result of evaluation. In this case, there is such an effect that an optical system having insufficient characteristic can be recovered to have a predetermined characteristic value according to circumstances by adjusting the positions of the photodetectors finely, thus making it possible to improve production yield.

With this device, in which a technique suitable for automatic assembly and evaluation by means of a computer is adopted, improvement of productivity can be expected.

Figure 24:
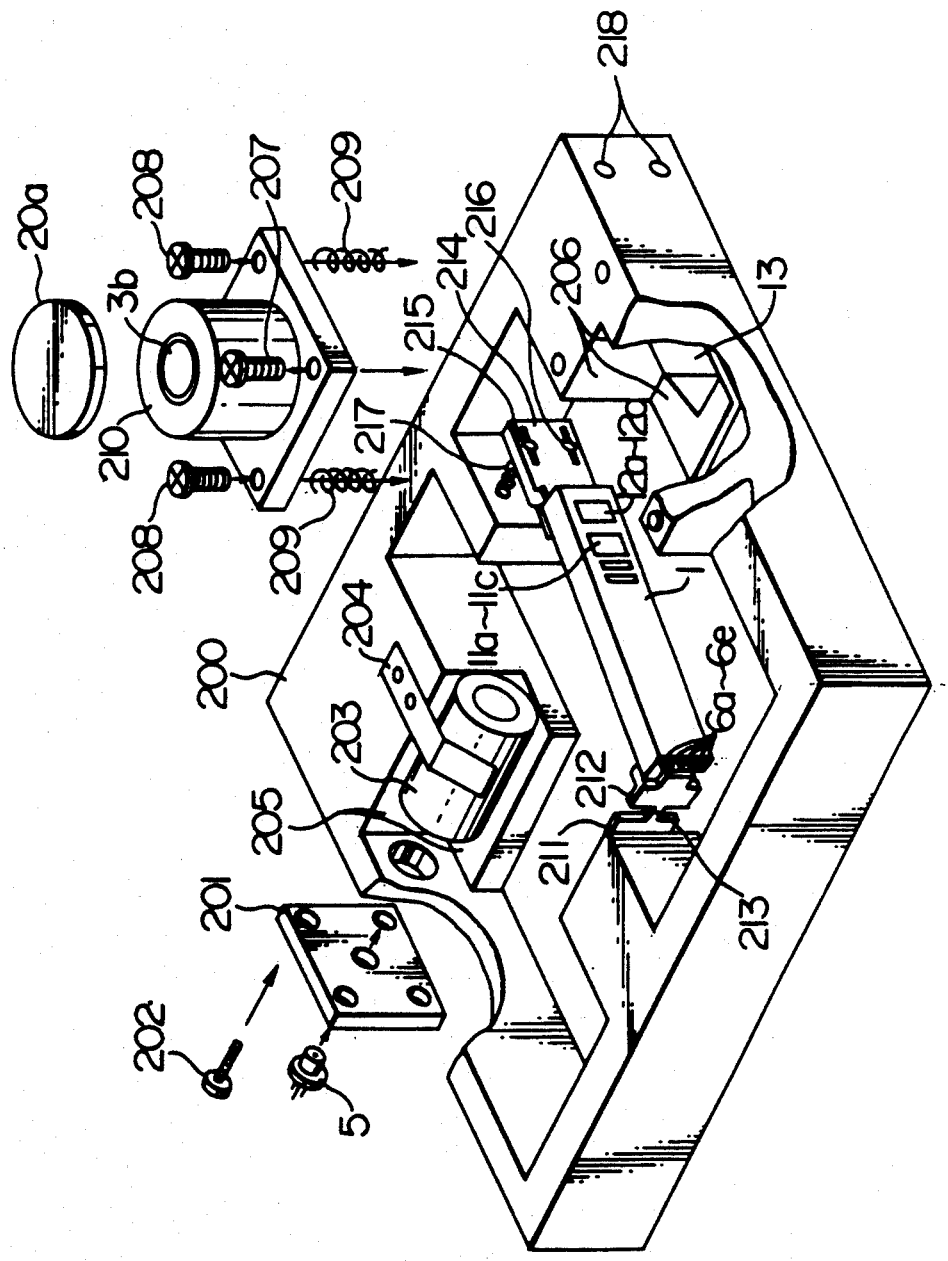
FIG. 24 shows still another embodiment of the present invention and is also a perspective view showing a packaging method of optical components of an optical head in an optical information read/read-write device.

Next, a method of packaging an optical element in an optical pickup will be explained with reference to FIG. 24. FIG. 24 is a perspective view showing a structure of an optical pickup. In FIG. 24, the semiconductor laser 5 is fitted to an auxiliary member 201. The auxiliary member 201 is fitted to a housing 200 with a screw 202. The outside diameter of the screw 202 excluding the screw head thereof is smaller than a hole bored in the auxiliary member 201, which presents backlash. Utilizing this backlash, the fitting position of the semiconductor laser 5 fitted to the auxiliary member 201 is adjusted. A semiconductor laser having a flange with a hole which can be fixed to the housing 200 directly with the screw 202 may also be used. In this case, it is possible to omit the auxiliary member 201. Further, adhesives or welding may be adopted instead of a screw for fitting the auxiliary member 201 or the semiconductor laser 5. The beams of light emitted from the semiconductor laser 5 are formed into parallel beams of light by the lens 3a. Here, the lens 3a has a cylindrical shell 203 and is pressed against a wall surface 205 by means of a spring 204 fixed to the housing 200. The wall surface 205 consists of two planes which are not parallel with each other, and the shell 203 of the lens 3a which is held against two planes has a structure which is movable in the optical axis direction of the lens 3a. Utilizing the movement of lens position, the beams of light emitted from the semiconductor laser 5 are adjusted to be parallel with each other. After they are made parallel with each other, it is also possible to fix the outer wall and the housing 200 with adhesives, screw and the like so that the positions thereof will not get out of the place.

The spring 204 is used for holding the shell 203 of the lens 3a, but this spring 204 has such an effect of pressing the shell 203 against the wall surface 205 and fixing it temporarily for easy adjustment. In adjustment, this spring 204 may be omitted by performing adjustment while pressing the shell 203 against the wall surface 205. In this case, there is such an effect that the number of components may be reduced.

The beams of light emitted through the lens 3a pass through the substrate 1 and are deflected by a reflecting mirror 13. This reflecting mirror is provided while contacting wall surfaces 206 consisting of a plurality of planes, thus the fitting position thereof being established. The reflecting mirror and the housing 200 are fixed together using adhesives and the like. The fitting position of the semiconductor laser is adjusted so that the beams of light deflected by the reflecting mirror 13 take a predetermined angle with respect to the housing 200. Otherwise, it may also be done in such a manner that the position of the reflecting mirror 13 is adjusted before fixing the reflecting mirror 13 so that the beams of light deflected by the reflecting mirror 13 take a predetermined angle with respect to the housing, and the reflecting mirror 13 is fixed to the wall surface 206 thereafter.

On the housing 200, a lens actuator 210 is mounted with screws 207 and adjusting screws 208. When the adjusting screws 208 are screwed into the housing 200, springs 209 are put between the lens actuator 210 and the housing 200. The position of the lens actuator with respect to the housing 200 can be adjusted in accordance with the tightening condition of adjusting screws 208. This adjustment is made so that the optical axis of the beams of light deflected by the reflecting mirror 13 and the optical axis of the lens 3b mounted on the lens actuator 210 become parallel with each other. With such a construction, there is such an effect that the optical axis of the lens actuator 210 can be adjusted easily. Further, separately from FIG. 24, it can be constructed in such a manner that a shim is put between the lens actuator 210 and the housing 200 in place of springs 209, and screws 208 are tightened. In this case, the optical axis is adjusted by varying the thickness of the shim. With such a construction, it is possible to increase the fitting strength of the lens actuator 210 so as to devise stabilization of the optical axis for a long period of time and improvement of reliability.

A dummy optical information recording medium 20a is disposed at the position of the focal point formed by the lens 3b. This is an adjustment jig for installing an optical system temporarily at a position where the optical information recording medium is to be located originally when the optical system is adjusted. Either the original information recording medium or the reflecting mirror may be used for the dummy optical information recording medium 20a.

The reflected beams of light from the dummy optical information recording medium 20a transmit the lens 3b and are deflected by the reflecting mirror 13 and incident to the diffraction gratings 12a, 12b and 12c. Thereafter, the beams of light are incident to the photodetectors 6a through 6e by the process which has been described so far. The outputs from the photodetectors are subject to signal processing shown in FIG. 21, and a readout signal, a track error signal and a focusing error signal are output.

It is important that the beams of light are incident to the diffraction gratings 12a through 12c are accurate angles for efficient optical coupling in the grating couplers 11a through 11c. An angle adjusting method for this purpose will be explained. Here, explanation is given with reference to FIG. 24 and FIG. 25 is an enlarged view of an angle adjusting portion of FIG. 24.

On the substrate 1 are fitted a holder 212 including a member 211 and a flexible portion 213 and a holder 214. The fitting may be performed by screwing, calking, adhesion with adhesives and so on. It is possible to reduce a thermal stress applied to the substrate 1 and the holders 212 and 214 by making the difference in coefficients of thermal expansion zero or small by means of the substrate 1 and the holders 212 and 214. This produces an effect of improving reliability. The flexible portion 213 of the holder 212 is materialized by providing a constricted portion between the holder 212 and the member 211, and this constricted portion has a function as a hinge. It is possible to increase flexibility of this constricted portion by using a spring material for the holder 212. If the holder 212 is not adhered to the substrate 1, this member 211 is fixed to the housing 200 with a screw 219. With this, if the holder 214 is not fixed, the positional relationship between the substrate 1 and the housing 200 may be varied comparatively freely in other direction than that in which the flexible portion 213 extends with the flexible portion 213 of the holder 212 as a hinge.

At least two holes are provided on the holder 214, and screws 215 and 216 are screwed into screw holes 220 located on the housing 200 through these two holes. On the screws 215 and 216, springs 217 are provided through respective screws between the holder 214 and the housing 200. It is possible to adjust the inclination of the substrate 1 depending on the tightening quantity of two screws 215 and 216. That is, when the tightening quantities of the screws 215 and 216 are varied by the same quantity at a time, the angle formed between the long side of the substrate 1 and the incident light is varied. Further, when the tightening quantities of the screws 215 and 216 are varied the other way by the same quantity, the angle formed between the short side of the substrate 1 and the incident angle is varied. Through such adjustment, the incident angles when the reflected beams of light from the dummy optical information recording medium 21a are incident to the diffraction gratings 12a, 12b and 12c are adjusted.

In FIG. 24, such an inclination with which d.c. drift on the focus error signal may be disregarded is established while getting a large optical coupling efficiency in the adjustment of the inclination of the substrate 1. For this purpose, the screws 215 and 216 are adjusted while monitoring these signals with the signal processing circuit shown in FIG. 21. In this case, it is made easy to handle a screw driving tool by providing axial directions of respective screws and the holes 218 bored in the housing 200 appropriately.

In FIG. 24, the holder 214 is fitted on the side of the substrate 1 where the diffraction gratings 12a through 12c are located, and the holder 212 is fitted on the side thereof where the photodetectors 6a through 6e are located. Same effect on the adjustment of the inclination of the substrate is obtainable when the holder 212 is fitted on the side where the diffraction gratings 12a through 12c are located and the holder 214 is fitted on the side where the photodetectors 6a through 6e are located in contrast with the above.

In FIG. 24, the lens actuator 210 in which the lens 3b is movable both in the optical axis direction and in the direction perpendicular to the optical axis is used so as to perform both focusing and tracking by the movement of the lens 3b. Otherwise, it may also be arranged so that the lens actuator 210 performs focusing only by moving the lens 3b in the optical axis direction, and tracking is performed by driving the reflecting mirror 13 as a galvanomirror. In this case, the foregoing means that a dedicated actuator is used for focusing and tracking, respectively, thus making it possible to perform respective operations more accurately.

Next, another embodiment of the holders 214 and 212 shown in FIG. 24 will be described with reference to FIG. 26.

In FIG. 26, a holder 214 and a holder 212a are fitted to the substrate 1. A spring 213a is fitted to the holder 212a, and a holder 212b is fitted to this spring 213a. The technique of fitting the holders 212b and 214 to the housing 200 is similar to that shown in FIG. 25, and the adjusting method of the inclination of the substrate 1 is also similar to those shown in FIG. 24 and FIG. 25. Here, the holder 212 shown in FIG. 25 is divided into two portions, 212a and 212b, and both portions are connected with the spring 213a. With this, there is such an effect that the rigidity of the flexible portion 213 in FIG. 25 may be set freely, thereby to increase the reliability of the flexible portion.

Next, another embodiments of the holders 212 and 214 shown in FIG. 24 are explained with reference to FIG. 27.

Figure 27:
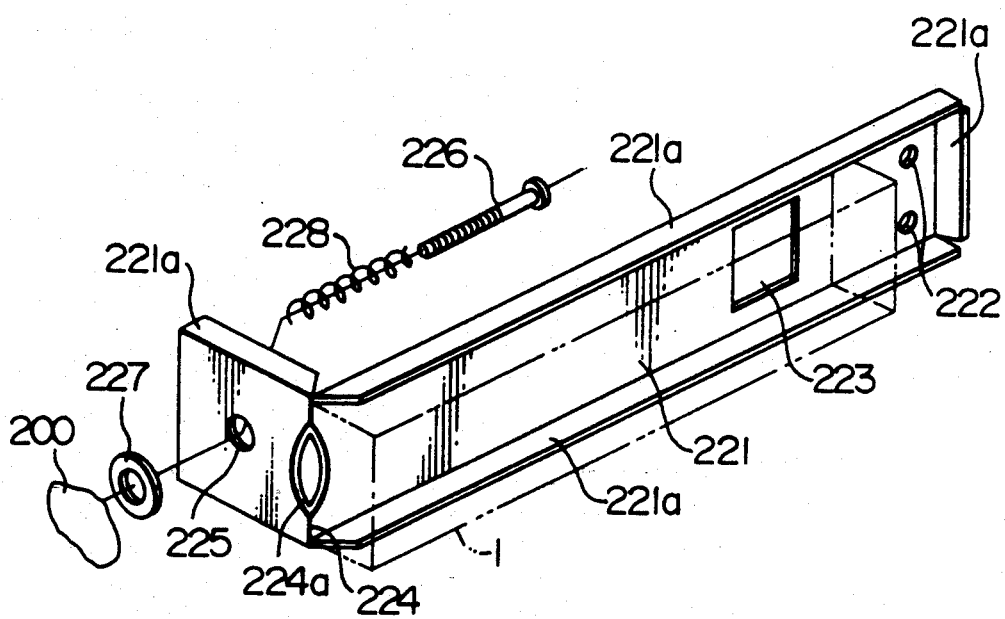

In FIG. 27, the substrate 1 is fixed to the holder 221. The holder 221 is provided with a reinforcing portion 221a in case of necessity in order to increase the rigidity against the bending. Furthermore, the holder 221 is provided with a bending portion 224. The bending portion 224 is provided with a rigidity reducing portion 224a which arranges not to provide a reinforcing portion 221a against bending, opens a hole and reduces the thickness of the material partially. With this, the portion having the weakest bending rigidity of the holder 221 forms a bending portion 224 with respect to the longitudinal direction of the holder 221. Further, the holder 221 has a hole 225. A screw 226 is tightened to the housing 200 through a spring 228, a hole 225 and a washer 227. With this, the holder 221 is pressed against the housing 200 by pressurization by the spring 228. With such a construction as described above, the holder 221 can be rotated with the hole 225 as a bearing, and the bending portion 224 can be bent as a hinge.

The holder 221 is provided with holes 222 and is fixed to screw holes 220 located on the housing 200 through the screws 215 and 216 and the spring 217 shown in FIG. 25. The inclination of the substrate 1 is adjusted by the technique explained with reference to FIG. 24 and FIG. 25.

It has such effects to use such a holder 221 that the number of components can be reduced by forming components in one body and that productivity may be improved since the holder 221 has a configuration suitable for mass production.

Here, a window 223 is provided at the light passing portion of the holder 221. With this, high optical performance can always be maintained without intercepting necessary beams of light.

It is possible to use a component which is flexible longitudinally such as a spring washer, an 0-ring using resin or rubber for the spring 228 other than an ordinary spring. When such a component is utilized, there is such an effect that components can be made small in size and light in weight.

The spring 228 may be omitted. In this case, the screw 226 is not tightened completely and appreciable backlash is given to the hole 225 in order to make the hole 225 act as a bearing when the inclination of the substrate 1 is adjusted. After the adjustment is finished, the screw 226 is tightened completely, so that there is no backlash. By doing so, such effects are obtainable that reduction in the number of components and maintenance of optical performance for a long period of time by stabilization of alignment after completion of adjustment may be expected.

It is the purpose of the washer 227 to make the bearing action of the hole 225 smooth, but the washer 227 may be omitted by smoothing the surface of the portion touched by the washer 227 of the housing 200.

It is also possible to provide the washer 227 between the holder 221 and the spring 228 or between the spring 228 and at the portion where the screw 226 is touched by the spring 228. With this, it is possible to make the bearing action of the hole 225 more smooth and adjustment of the inclination of the substrate 1 easier.

Next, the basic operating status of the present invention will be explained with reference to FIG. 28. The lens actuator 210 is fitted to the housing 200 which includes the optical system and the mechanism system which have been explained so far with reference to FIG. 1 through FIG. 27. The semiconductor laser (the semiconductor laser 5 shown in FIG. 24) which is built in the housing is driven by the automatic power control unit 232. The beams of light are converged by a condenser lens in the lens actuator 210 through the optical path which has been described so far, and a focal point is formed on the optical information recording medium 20. The reflected beams of light are incident again to the optical system in the housing 200, and the light intensity is detected. The detected signal is processed by a signal processor 231 and becomes an information readout signal, a tracking error signal and a focus error signal of the optical information recording medium 20. These signals are delivered to a system controller 230.

For the means of performing tracking, there are means for performing by moving the housing 200 (referred to as coarse tracking), and means for performing while fixing the housing 200 (referred to as fine tracking). The means of coarse tracking mounts the housing 200 on a rail mechanism 255 and moves the housing 200 on the rail mechanism 255 by means of an actuator 256. The means of fine tracking includes means of performing tracking by moving the lens 3b which is built in the lens actuator in FIG. 24 in a direction perpendicular to the optical axis of the lens and means of performing tracking by varying the inclination of the reflecting mirror 13 which is used as a galvanomirror as explained with reference to FIG. 24. In the fine tracking, either one of these two means may be adopted.

In tracking, a signal corresponding to the track error signal is delivered from the system controller 230 to both a drive circuit 234a and a drive circuit 234b. The drive circuit 234a drives the actuator 256 so as to perform coarse tracking. Also, the drive circuit 234b drives the fine tracking mechanism so as to perform fine tracking.

Some of means of performing focusing are operated by moving the lens 3b shown in FIG. 24 which is built in the lens actuator 210 in the direction of the optical axis.

In focusing, a signal corresponding to the focus error signal is delivered from the system controller 230 to a drive circuit 235, which moves the lens in the lens actuator 210 in the direction of the optical axis thereof so as to perform focusing.

The rotary optical information recording medium 20 is fixed by a chuck mechanism 251 and is rotated by a motor 250. The motor 250 is driven by a drive circuit 236. The drive circuit 236 drives the motor 250 by the command from the system controller 230. Further, a motor 252 which drives the chuck mechanism 251 is driven by a drive circuit 237 by the command of the system controller 230. Here, a drive circuit means an interface circuit for performing motor operation in accordance with the signal of the system controller 230. It feeds signals of corresponding frequency (including D.C.), electric power and duty ratio to the motor in accordance with the command signal.

When the optical information recording medium 20 is replaced, the motor 250 is stopped rotating and the chuck 251 is removed. Then, a drive circuit 258 drives a motor 257 by the command from the system controller 230, and the motor 257 drives a conveying mechanism 259, thus carrying the optical information recording medium outside a casing 262 from a cover 261 along a rail 260. On the other hand, a process reverse to the foregoing is taken for fitting an external optical information recording medium to a motor 250.

The controller is connected to an interface 263 and a power source 264, and the interface 263 performs interface operation when an optical information readout signal from the controller is delivered to an external device not shown. The output from the interface 263 is connected to an output terminal 266. Further, the power source 264 acts as the power source for circuits and devices in the casing 262. The power source 264 is supplied with electric power from the outside through an input terminal 267.

With the above-described structure, there are such effects that the number of components of the optical system can be reduced and improvement of both productivity and reliability may be expected. Since the optical system in the housing 200 is miniaturized, the housing 200 itself is made light in weight. This means that the load of the actuator 256 is reduced. With this, there are such effects that electric power supplied to the actuator 256 can be reduced so as to save energy, and additionally, that the coarse access time can be shortened because acceleration of the housing 200 may be increased, thus shortening the access time to information.

Further, in addition to the above-described structure, it is possible to provide an input terminal 265. Through this terminal 265, information to be recorded from external devices which are not shown is input. This information is supplied to the automatic power control (APC) circuit 232 through the interface 263. With this, the light intensity of the semiconductor laser (the semiconductor laser 5 shown in FIG. 24) which is built in the housing 200 is adjusted in accordance with the information given to the automatic power control circuit 232. With this, the intensity of the light irradiated to the optical information recording medium 20 is modulated. The nature of a portion of the optical information recording medium 20 which is irradiated with light changes by the energy of irradiated light, thus making it possible to record information in the optical information recording medium 20. In this case, it is also possible to apply a magnetic field to the portion of the optical information recording medium 20 which is irradiated with light using a magnet 270. A permanent magnet or an electromagnet is used for this magnet.

When information is loaded in the optical information recording medium 20, there is other means in which the light intensity is not modulated. In this case, the beams of light from the semiconductor laser are not varied in accordance with the loaded information, but are fixed to a certain predetermined light quantity in loading. At the time of readout, they are fixed at other constant light quantity. Then, at the time of loading, external information is supplied to the electromagnet 270 through the interface 263, thereby to modulate the direction or the intensity of the magnetic field at the portion irradiated with light. With this, the information is recorded on the optical information recording medium 20. In this case, the magnet 270 may be mounted either on the housing 200 or on a moving mechanism interlocked with the housing 200.

With such a construction as described above, it becomes possible also to load optical information on the optical information recording medium in addition to readout of optical information.

It is possible to connect a high frequency generator 233 to the automatic power control circuit 232. Here, the high frequency generator 233 generates a high frequency having a frequency in a band which is higher than the frequency band of readout signal or write signal of the optical information. In accordance with the signal from this high frequency generator, the output of the automatic power control circuit 232 is modulated, thus modulating the semiconductor laser with a high frequency. By doing so, such effects are obtained that the operation of the semiconductor laser is stabilized and unnecessary signals are removed, thereby to improve the S/N ratio.

Figure 29:
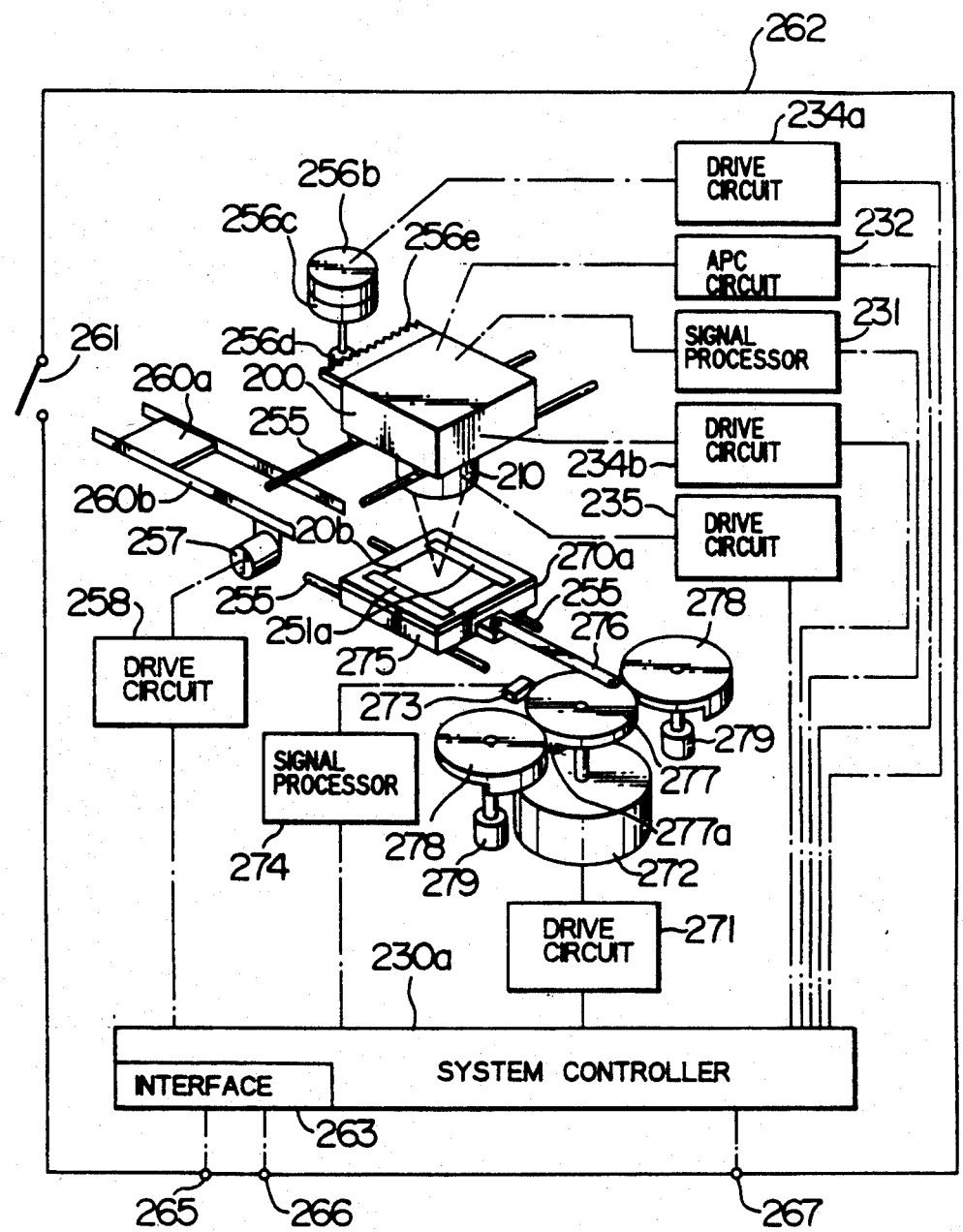
FIG. 29 is a block diagram showing the whole embodiment of the optical information read/read-write device having another construction.

Next, FIG. 29 shows a construction of another embodiment of the present invention. In the present embodiment, a card type optical information recording medium is used. The lens actuator 210 is fitted to the housing 200 having the optical system and the mechanism system which have been explained with reference to FIG. 1 through FIG. 27. The semiconductor laser (the semiconductor laser 5 shown in FIG. 24) which is built in the housing is driven by the automatic power control circuit 232. These beams of light are converged by a condenser lens in the lens actuator 210 through the path which has been described so far, and a focal point is formed on an optical information recording medium 20b. The reflected beams of light are incident again to the optical system in the housing 200, and the light intensity is detected. The detected signals are processed in the signal processor 231, and become an information readout signal, a tracking error signal and a focus error signal of the optical information recording medium 20b. These signals are delivered to a system controller 230a.

There are coarse tracking means and fine tracking means for the means for performing tracking, which are similar to what was explained with reference to FIG. 28. In this description, an example in which the rotational speed of a motor 256b is reduced by a speed reduction mechanism 256c and the housing 200 is moved by means of gear 256d and 256e is shown as an example of the coarse actuator. As the technique of coarse tracking other than the above, there are a technique using a voice-coil type actuator for a straight rail, a technique of moving the lens actuator 210 in a circular arc form by means of a rotary shaft provided in the housing 200 and so forth. These techniques are applicable to FIG. 28 in a similar manner. Also, means for performing focusing are similar to that explained with reference to FIG. 28.

The card type optical information recording medium 20b is fixed to a base 275 by means of a chuck mechanism 251. The base 275 is connected to a crank 277 through a connecting rod 276. The base 275 reciprocates linearly on the straight rail mechanism 255 by rotating the crank 277 with a motor 272.

In order to reduce vibration caused by the reciprocating motion of the base 275 and the motion of the connecting rod 276, a mass balancer 277a is fitted to the crank 277, and in addition, a balancer 278 which rotates synchronously with the rotation of the crank 277 is provided. The balancer 278 transfers the motive power by a gear or a belt for rotating. For example, a gear provided on the crank 277 and a gear provided on the balancer 278 are geared each other, and the balancer applied with the motive power is rotated. The balancer 278 is supported by a bearing 279. Only one piece of balancer 278 will do, but vibration can be reduced further by providing a plurality of balancers.

Coarse access is made by driving the motor 256b through a drive circuit 234a based on the signal delivered to the system controller 230a from the signal processor 231, and fine access is executed by driving a fine access mechanism through the drive circuit 234b. Further, focusing is executed by driving the lens actuator 210 through a drive circuit 235.

When the optical information recording medium 20b is replaced, the motor 272 is stopped rotating, and a chuck 251a is removed. Then, a drive circuit 258 drives a motor 257 by the command from the system controller 230a, and the motor 257 drives a carrying mechanism 260a, thereby to carry the optical information recording medium 20b out of a casing 262 through a cover 261 along a rail 260b. On the other hand, it is performed following a process reverse to the above to fit an external optical information recording medium to a motor base 275.

The controller is coupled with an interface 263, and the interface 263 performs interface operation when an optical information readout signal from the controller is delivered to an external device not shown. The output from the interface 263 is connected to an output terminal 266. Further, the system controller 230a is supplied with electric power from the outside through an input terminal 267.

In order to detect the rotational phase of the motor 272, a position detecting unit 273 is provided. Here, this unit 273 detects a projection, a magnet and the like provided on a portion rotated by the motor 272 optically or by a magnetic sensor. By detecting the rotational phase of the crank 277, there is such an effect that the position of the base 275 can be judged, which can be used as a trigger signal for commencing a process in case of read/write of a signal, thus making signal read/write process control easier. With such a construction as described above, there is such an effect that the number of components of an optical system can be reduced and improvement in productivity and reliability may be expected in a card type optical information recording medium readout device. Since the optical system inside the housing 200 is miniaturized, the housing 200 itself becomes light in weight. It means to reduce the load of the actuator 256b. With this, such an effect is obtained that electric power supplied to the actuator 256b can be reduced to save energy, and in addition, there is an effect that coarse access time may be shortened because acceleration of the housing 200 can be improved, and thus the access time to information may be shortened. Further, it is possible to materialize a reciprocating mechanism of low vibration and high energy efficiency for an optical information recording medium by using a crank mechanism.

Further, in addition to the above-described construction, the input terminal 265 may be provided. Information to be recorded is input through this terminal 265 from an external device not shown. This information is supplied to the automatic power control circuit 232 through the interface 263 and the system controller 230a. With this, the light intensity of the semiconductor laser (the semiconductor laser shown in FIG. 24) which is built in the housing 200 is modulated in accordance with the information given to the automatic power control circuit 232. With this, the light intensity irradiated to the optical information recording medium 20b is modulated. The nature of a portion of the optical information recording medium 20 changes by the energy of irradiated light, thus making it possible to record information on the optical information recording medium 20b. In this case, it is also possible to apply a magnetic field to the portion of the optical information recording medium 20 which is irradiated by light by using a magnet 270a. A permanent magnet or an electromagnet is used for this magnet 270a. Although an example in which a permanent magnet is installed at a part of the base 275 is shown, but a magnet may also be installed at a portion which does not move by forming it separately from the base 275.

There is also means which does not modulate the light intensity when information is loaded on the optical information recording medium. In this case, the beams of light of the semiconductor laser are not varied in accordance with the information to be loaded, but are fixed by a certain constant light quantity which is determined at the time of loading. At the time of readout, they are fixed at other constant light quantity. Then, information from the outside is supplied to the electromagnet 270a through the interface 263, thereby to modulate the direction or the intensity of the magnetic field at the portion irradiated with light. With this, information is recorded on the optical information recording medium 20. In this case, the magnet 270a may be mounted either on the housing 200 or on a moving mechanism which is interlocked with the housing 200.

With such a construction as described above, not only readout of optical information, but also loading of optical information on the optical information medium are made possible.

Figure 28:
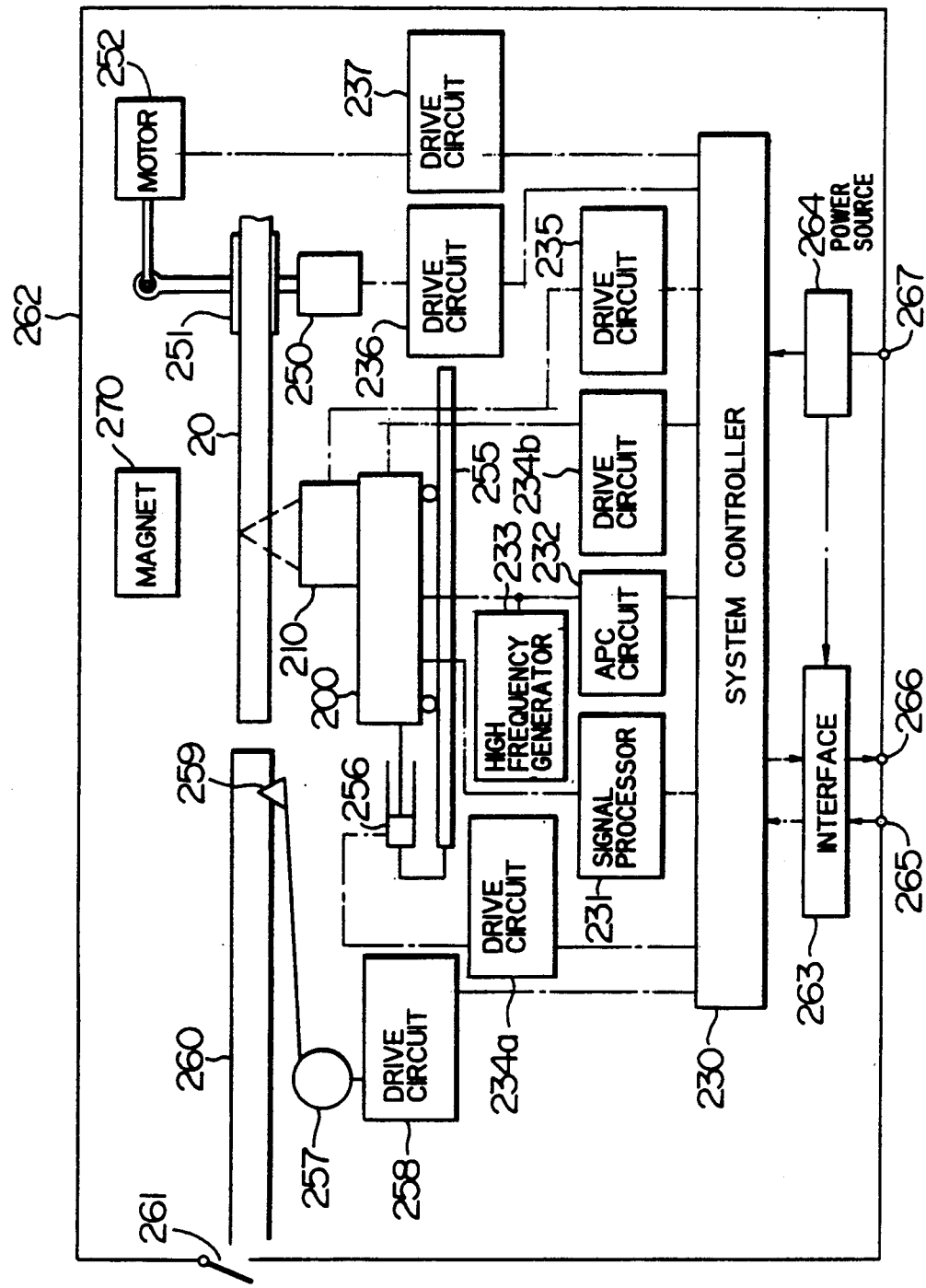

It is not shown in FIG. 29, but a high frequency generator may be connected to the automatic power control circuit 232 in the similar manner as FIG. 28. Effects and so on are also the same.

I claim:

1. An optical head, comprising:
   a plane waveguide for propagating light therethrough;
   at least one grating coupler provided at a part of said waveguide for converting incident light into light which is propagated in said waveguide;
   at least one first diffraction grating for diffracting light which is emitted from a light source and incident thereto; and
   diffracting means for further diffracting light which has been diffracted by said at least one first diffraction grating and leading the diffracted light to said at least one grating coupler.

2. An optical head according to claim 1, wherein incident light to said at least one first diffraction grating is light which was emitted from said light source and reflected by an optical information recording medium in which digital information has been recorded therein.

3. An optical head according to claim 1, wherein said diffracting means includes a second diffraction grating.

4. An optical head according to claim 3, wherein said second diffraction grating includes a dielectric multilayer film.

5. An optical head according to claim 1, wherein, when a plurality of grating couplers are provided, at least one of said plurality of grating couplers has a grating pitch which is different from that of remaining grating couplers.

6. An optical head according to claim 1, wherein there is provided a high frequency generator which superposes a high frequency a.c. to a d.c. current applied to said light source.

7. An optical head according to claim 1, wherein a multimode semiconductor laser is used for said light source.

8. An optical head according to claim 1, wherein incident light to said at least one first diffraction grating is light which was emitted from said light source and transmitted through an optical information recording medium in which digital information has been recorded.

9. An optical head according to claim 1, wherein a plurality of grating couplers and a plurality of first diffraction gratings are provided.

10. An optical head, comprising:
    a plane waveguide for propagating light therethrough;
    a substrate which has one surface contacting said waveguide and an opposite surface parallel with said waveguide and is light permeable at least at a wavelength of light from a light source;

at least one grating coupler provided at a part of said waveguide for converting light which was propagated in said substrate and incident thereto into light which is propagated in said waveguide;

at least one diffraction grating for diffracting light which was emitted from said light source and incident thereto and leading diffracted light in a predetermined direction in said substrate; and a second diffraction grating for further diffracting light which was diffracted by said at least one first diffraction grating and leading diffracted light to said opposite surface of said substrate, so that said led light is reflected by said opposite surface and led to said at least one grating coupler, wherein said substrate includes a slant portion which is not parallel with said waveguide at a part of said opposite surface.

11. An optical head according to claim 10, wherein there is further provided an antireflection film provided on said opposite surface of said substrate.

12. An optical head according to claim 10, wherein said first and second diffraction gratings are disposed so that said led light is reflected totally by said opposite surface.

13. An optical head, comprising:
a plane waveguide for propagating light therethrough;

at least one grating coupler provided at a part of said waveguide for converting incident light into light which is propagated in said waveguide;

at least one first diffraction grating for diffracting light which was emitted from a light source and incident to said at least one first diffraction grating;

a second diffraction grating for diffraction light which was diffracted by said at least one first diffraction grating and leading the diffracted light to said at least one grating coupler; and a plurality of waveguide lenses which permit light from said at least one grating coupler to pass therethrough.

14. An optical head according to claim 13, wherein said plurality of waveguide lenses include at least one convex lens and at least one concave lens.

15. An optical head, comprising:
a plane waveguide which has one surface contacting said waveguide and an opposite surface parallel with said waveguide and is light permeable at least at a wavelength of light from a light source;

at least one grating coupler provided at a part of said waveguide for converting light which is propagated in said substrate and incident thereto into light which is propagated in said waveguide;

first diffraction gratings which transmit parallel beams of light that are emitted from said light source and incident thereto and diffract said transmitting light which returns after being reflected by an optical information recording medium placed on an opposite side of said substrate with respect to said waveguide so as to lead the diffracted light in a predetermined direction in said substrate, said light source being disposed on the opposite side of said optical information recording medium with respect to said substrate;

a second diffraction grating which diffracts further said transmitting light which has been diffracted by said first diffraction gratings and leads the diffracted light to said opposite surface so that said led transmitting light is reflected by said opposite surface and is led to said at least one grating coupler, wherein a grating pitch L, an angle $\theta$ of said parallel light with respect to a normal to the interface between said waveguide and said substrate, a refractive index $n_0$ of said substrate, a refractive index $n$ of said waveguide and a wavelength $\lambda$ of said light source are determined in accordance with the following expression:

$$\left| \frac{n_0}{n} \cdot \sin\theta + \frac{\lambda}{n_0 L} \cdot m \right| \geq 1,$$

wherein, $m = \pm 1, \pm 2, \pm 3$.

16. An optical head, comprising:
a plane waveguide for propagating light therethrough;

a substrate which has one surface contacting said waveguide and an opposite surface parallel with said waveguide and is light permeable at least at a wavelength of light from a light source;

at least one grating coupler provided at a part of said waveguide for converting light which was propagated in said substrate and incident thereto into light which is propagated in said waveguide;

first diffraction gratings which transmit parallel beams of light that are emitted from said light source and incident thereto and diffract parallel light which returns after being reflected by an optical information recording medium placed on an opposite side of said substrate with respect to said waveguide so as to lead the diffracted light in a predetermined direction in said substrate, said light source being disposed on an opposite side of said optical information recording medium with respect to said substrate; and a second diffraction grating which diffracts further said returning parallel light which has been diffracted by said first diffracting gratings and leads the diffracted light to said opposite surface so that said led returning parallel light is reflected by said opposite surface and is led to said at least one grating coupler, wherein a grating pitch L, an angle $\theta$ of said parallel light with respect to a normal to the interface between said waveguide and said substrate, a refractive index $n_0$ of said substrate, a refractive index $n$ of said waveguide and a wavelength $\lambda$ of said light source are determined so as to satisfy the following expressions:

$$\left| \frac{n_0}{n} \cdot \sin\theta + \frac{\lambda}{n_0 L} \right| < 1 \text{ and}$$

$$\left| \frac{n_0}{n} \cdot \sin\theta - \frac{\lambda}{n_0 L} \right| \geq 1.$$

17. An optical head according to claim 16, wherein there is further provided an antireflection film on the opposite surface of said substrate.

18. An optical head, comprising:
a plane waveguide for propagating light therethrough;

a substrate which is provided so as to contact said waveguide and is light permeable at least at a wavelength of a light source;

at least one grating coupler provided at a part of said waveguide for converting light which is propagated in said substrate and incident thereto into light which is propagated in said waveguide;

a light source disposed on an opposite side of said waveguide with respect to said substrate;

a collimator lens which is disposed between said light source and said substrate and forms light emitted from said light source into parallel light;

an other lens which is disposed on an opposite side of said light source with respect to said waveguide, and converges said parallel light which has transmitted said waveguide so as to form a focal point on an information recording medium and forms reflected light from said optical information recording medium into parallel light;

first diffraction gratings which diffract parallel light from said other lens and lead the diffracted light in a predetermined direction in said substrate;

a second diffraction grating which further diffracts the parallel light which has been diffracted by said diffraction grating and leads the diffracted light to said grating coupler; and a waveguide lens which converges said parallel light which is led to said grating coupler.

19. An optical head, comprising:

a plane waveguide for propagating light therethrough;

a substrate which has one surface contacting said waveguide and an opposite surface parallel with said waveguide and is light permeable at least at a wavelength of light from a light source;

at least one grating coupler provided at a part of said waveguide for converting light which was propagated in said substrate and incident thereto into light which is propagated in said waveguide;

at least one first diffraction grating for diffracting light which was emitted from said light source and incident thereto and leading diffracted light in a predetermined direction in said substrate; and a second diffraction grating for further diffracting light which was diffracted by said at least one first diffraction grating and leading diffracted light to said opposite surface of said substrate, so that said led light is reflected by said opposite surface and led to said at least one grating coupler, and said at least one first diffraction grating and said second diffraction grating being disposed so that said led light is reflected totally by said opposite surface; and antireflection film means provided at one end of said substrate on an opposite side to said second diffraction grating with respect to said at least one grating coupler.

20. An optical head, comprising:

a plane waveguide for propagating light therethrough;

a substrate which as one surface contacting said waveguide and an opposite surface parallel with said waveguide and is light permeable at least at a wavelength of light from a light source;

at least one grating coupler provided at a part of said waveguide for converting light which was propagated in said substrate and incident thereto into light which is propagated in said waveguide;

at least one first diffraction grating for diffracting light which was emitted from said light source and incident thereto and leading diffracted light in a predetermined direction in said substrate; and a second diffraction grating for further diffracting light which was diffracted by said at least one first diffraction grating and leading diffracted light to said opposite surface of said substrate, so that said led light is reflected by said opposite surface and led to said at least one grating coupler; and antireflection film means disposed on a part of said opposite surface so as to lead light which is led to said opposite surface to said at least one grating coupler.

* * * * *